United States Patent [19]

Browning

[11] 4,419,891

[45] Dec. 13, 1983

[54] SUPPORT GRAVITY MEASUREMENT INSTRUMENT

[76] Inventor: Alva L. Browning, 1012 N. Lupine, Lompoc, Calif. 93436

[21] Appl. No.: 332,252

[22] Filed: Dec. 18, 1981

Related U.S. Application Data

[63] Continuation-in-part of Ser. No. 935,386, Oct. 13, 1978, abandoned, Ser. No. 757,754, Jan. 7, 1977, abandoned, Ser. No. 646,402, Jan. 2, 1976, abandoned, Ser. No. 510,559, Sep. 30, 1974, abandoned, Ser. No. 399,099, Sep. 20, 1973, abandoned, Ser. No. 404,294, Oct. 9, 1973, Pat. No. 3,965,755, and Ser. No. 41,845, Jun. 1, 1970, abandoned.

[51] Int. Cl.³ .............................................. G01V 7/14
[52] U.S. Cl. ................................. 73/382 G; 73/517 R
[58] Field of Search ............ 73/382 R, 382 G, 517 R, 73/517 B, 516 R

[56] References Cited

U.S. PATENT DOCUMENTS

| | | | |
|---|---|---|---|
| 3,027,767 | 4/1962 | Slack et al. | 73/382 R |
| 3,106,678 | 10/1963 | Lynn | 73/517 R |
| 3,148,456 | 9/1964 | Browning | 73/517 R |
| 3,693,451 | 9/1972 | Dunlap et al. | 73/382 |
| 3,815,418 | 6/1974 | Bradley | 73/382 |

OTHER PUBLICATIONS

"Status-A Summary of Advanced Technology Research at Martin Marietta" Oct. 1968 Martin Marietta Corp. 47 pp.

Primary Examiner—James J. Gill
Attorney, Agent, or Firm—Vernon D. Beehler

[57] ABSTRACT

A gravity anomalometer has dual units arranged in longitudinal alignment in a tube which in turn is maintained in substantially constant alignment with the center of gravity of the earth. Each unit has an upper electric member providing support for the mass and a similar lower electric member, with each member having an opening facing the opposite member. A single sensing mass initially supported in the upper member of each unit falls under the influence of gravity when the upper member is deenergized and is caught by the lower member when the latter is energized, after which the mass is returned to the upper field in a repeating cycle. Electronic means measure the rate of each fall of the mass. Since the mass in the upper unit is further from the earth's center of gravity than the mass in the lower unit the time consumed in a corresponding fall is less in the upper unit than in the lower unit. The difference in rate accordingly is made use of in determining the gravity gradient in a selected area.

51 Claims, 28 Drawing Figures

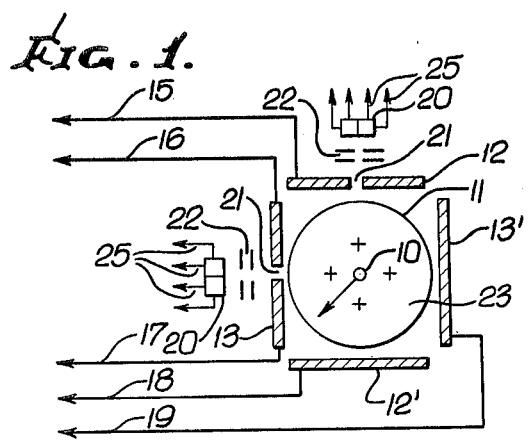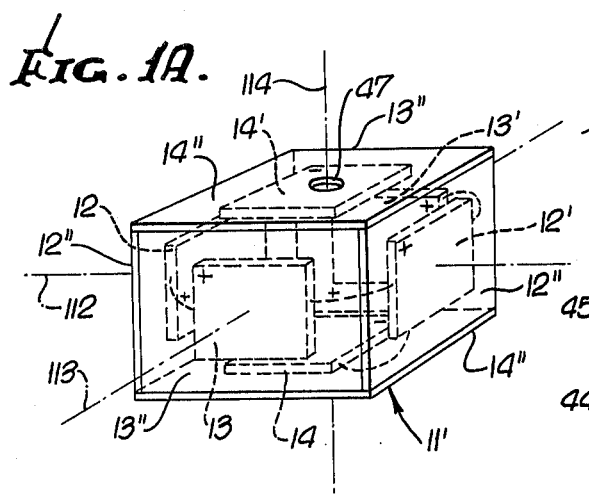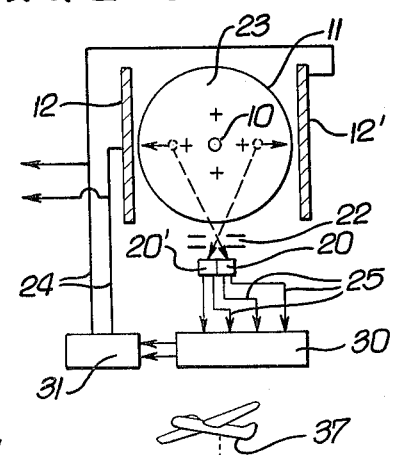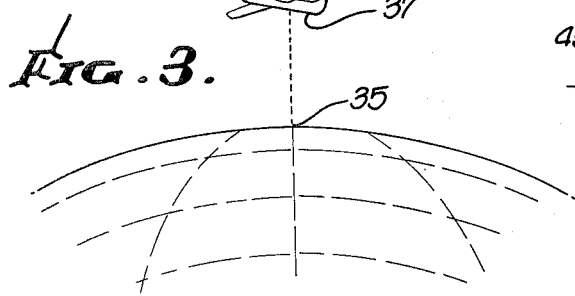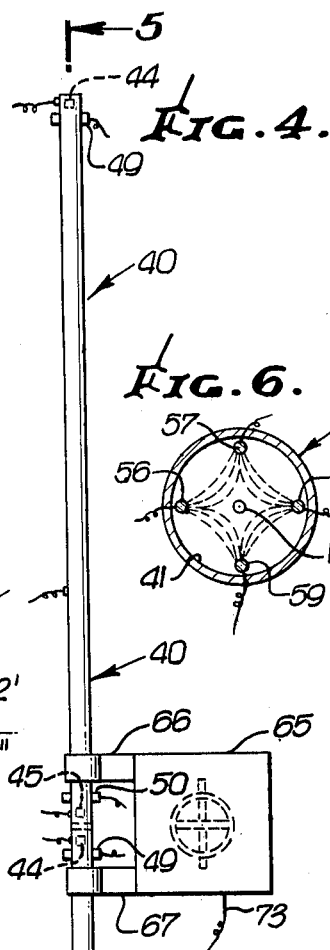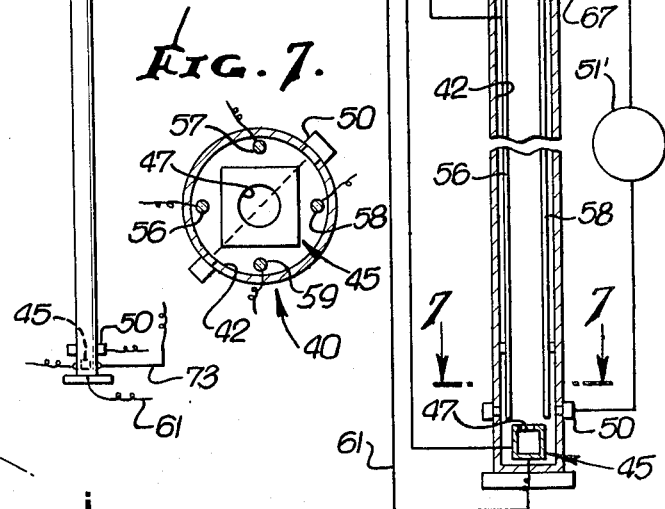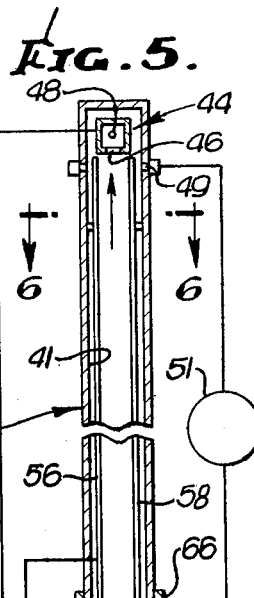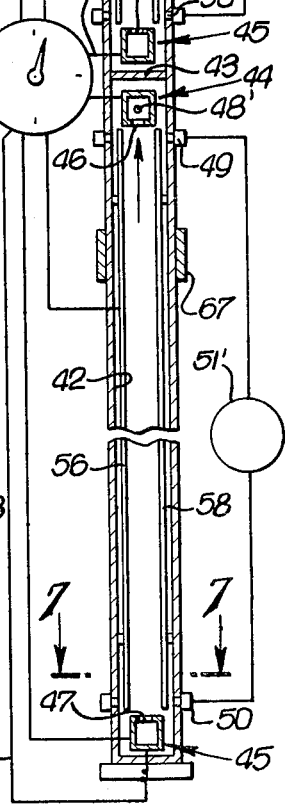

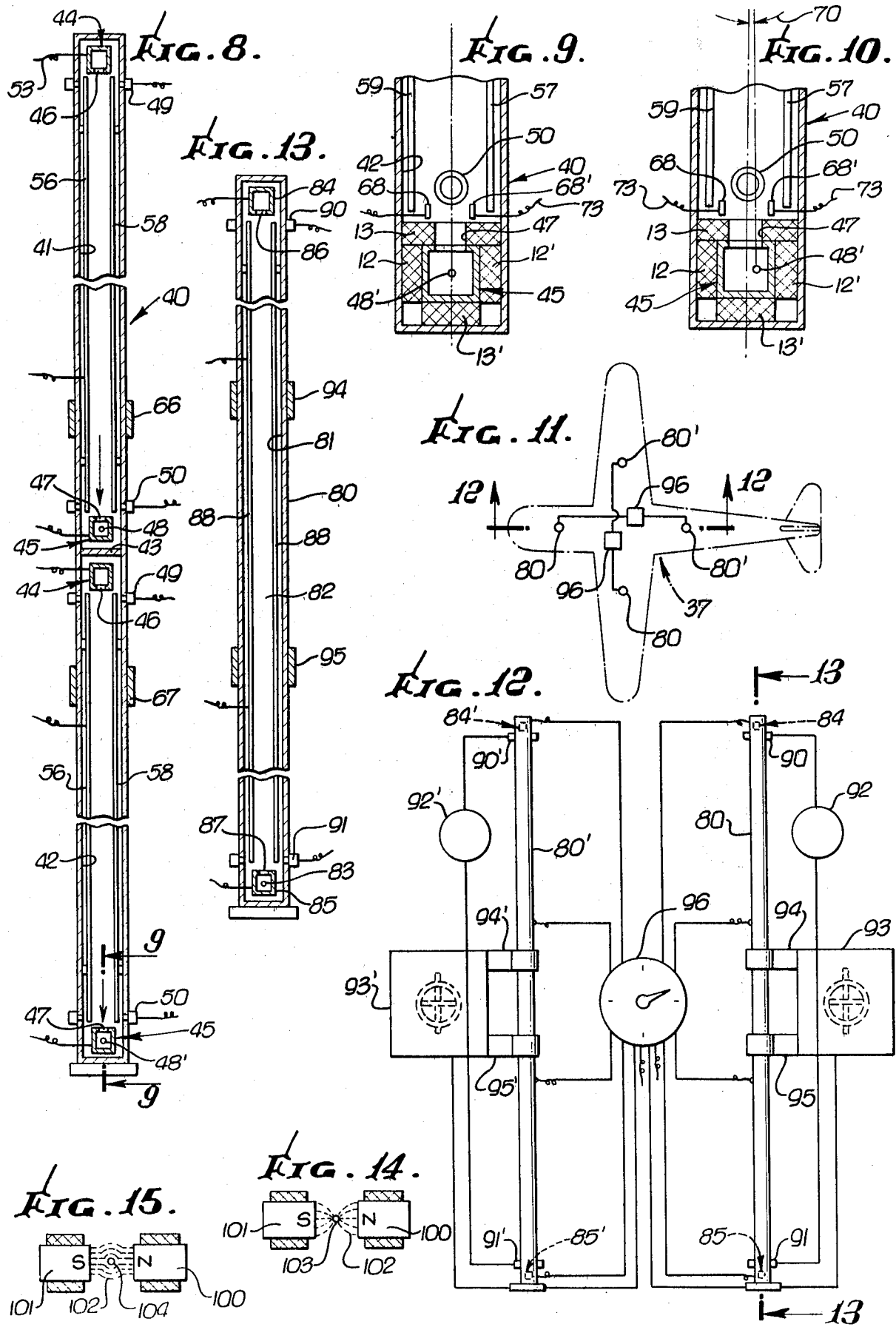

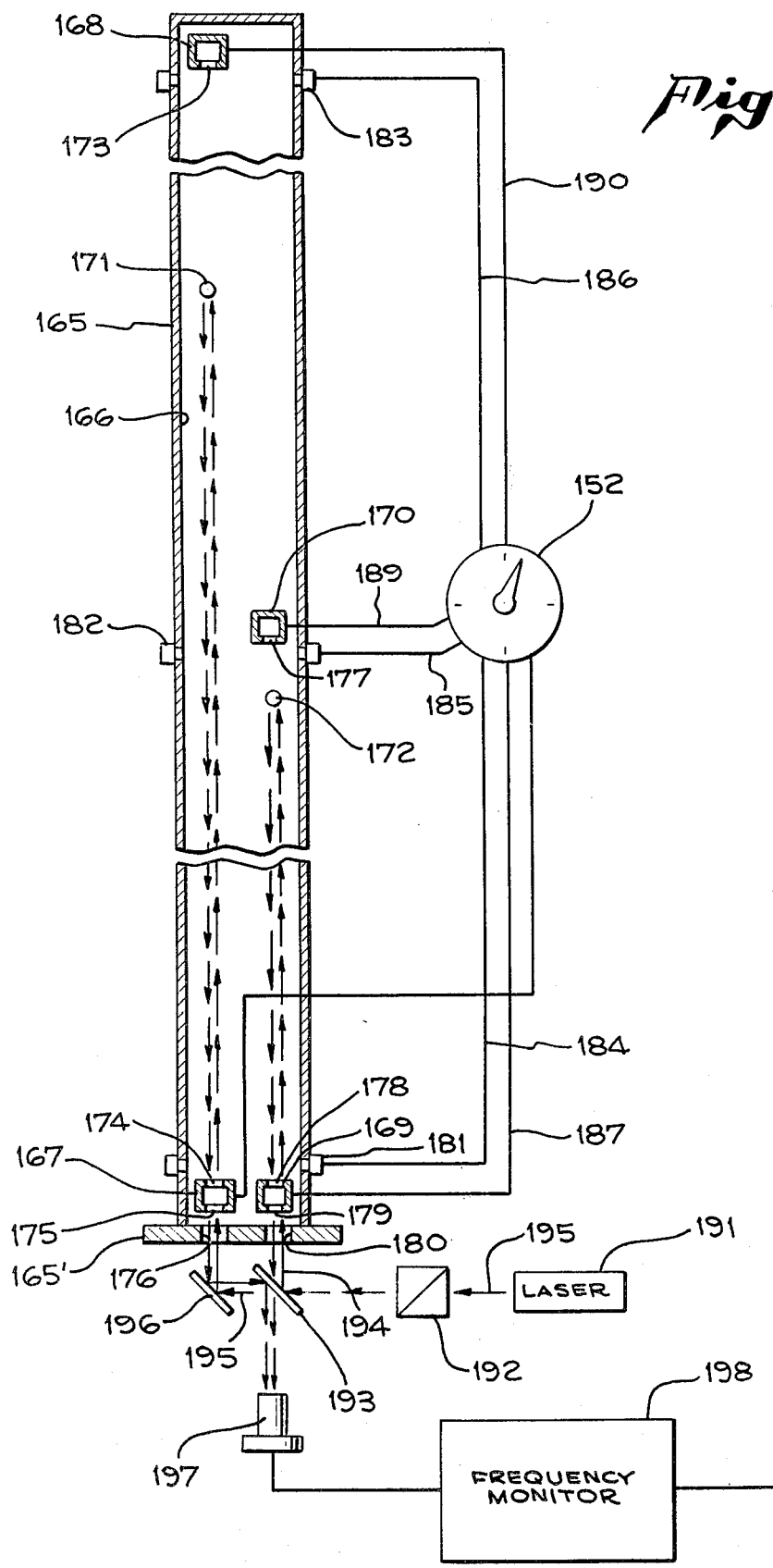

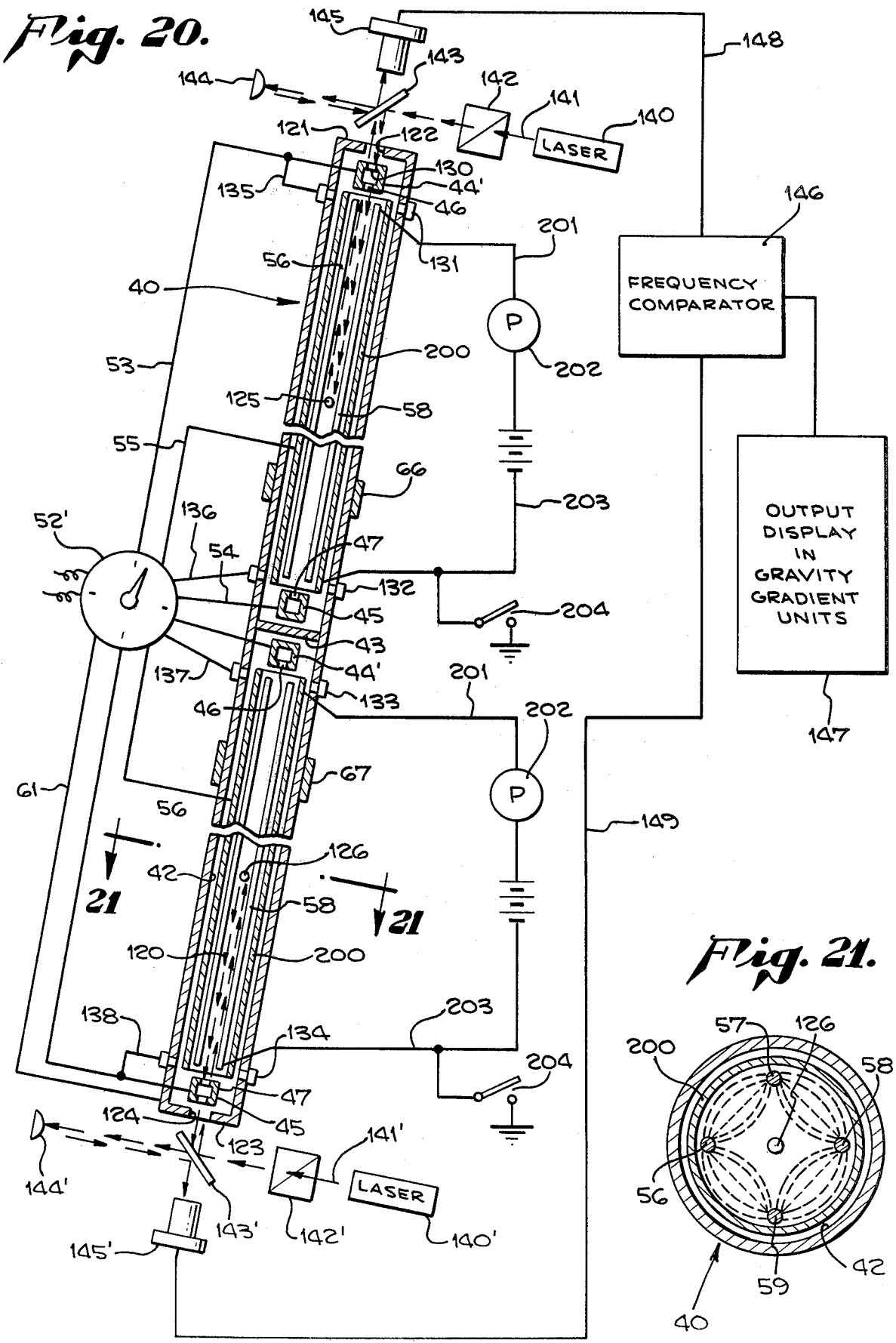

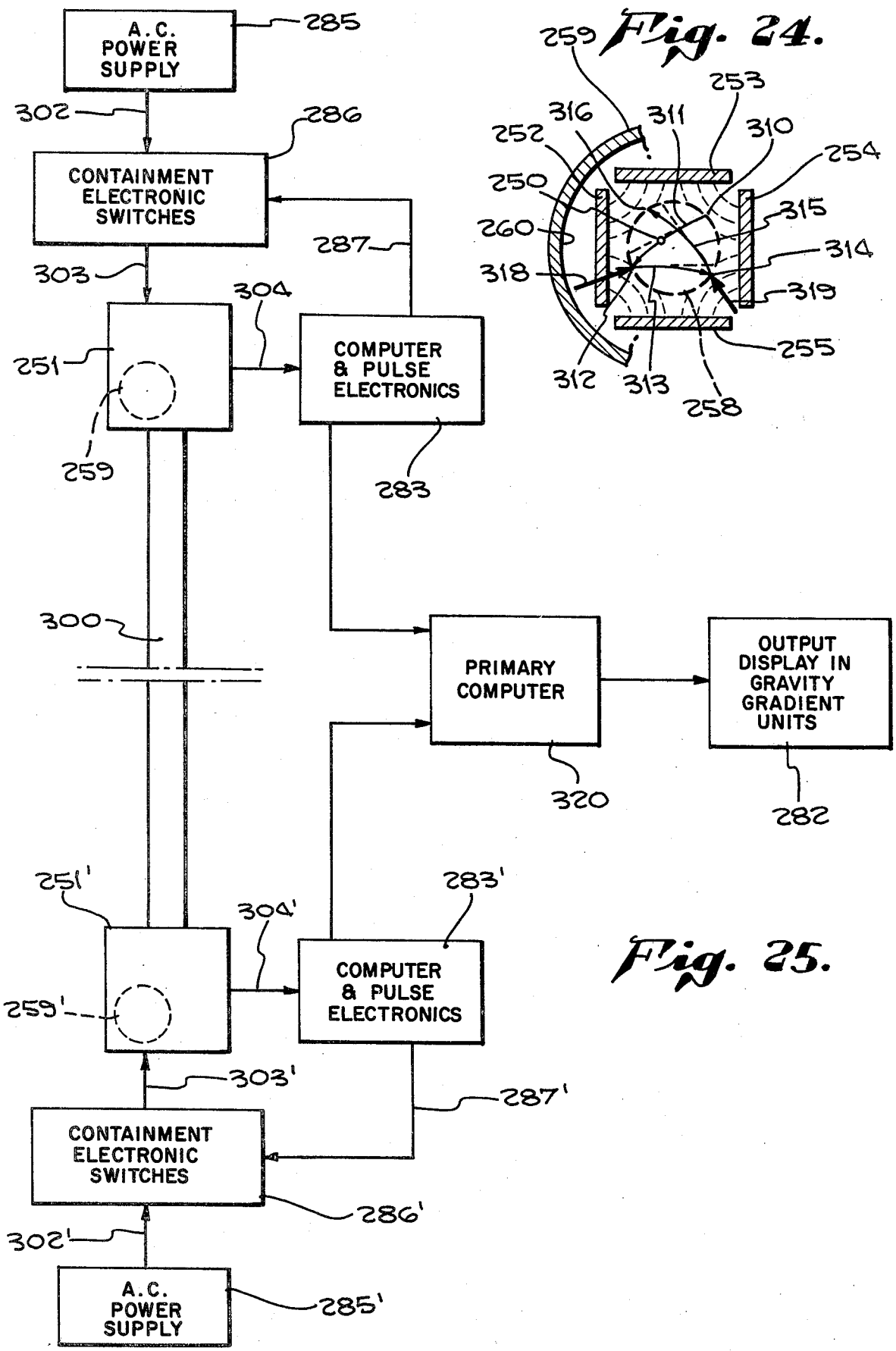

SUPPORT GRAVITY MEASUREMENT INSTRUMENT

This is an improvement upon prior U.S. Pat. No. 3,148,456, a continuation-in-part of copending application Ser. No. 041,845 filed June 1, 1970, now abandoned, Ser. No. 404,294 filed Oct. 9, 1973, now U.S. Pat. No. 3,965,755, Ser. No. 399,099 filed Sept. 20, 1973, now abandoned, Ser. No. 510,559 filed Sept. 30, 1974, now abandoned, Ser. No. 646,402, filed Jan. 2, 1976, now abandoned, Ser. No. 757,754, filed Jan. 7, 1977, now abandoned and Ser. No. 935,386, filed Oct. 13, 1978, now abandoned.

Heretofore one of the fundamental concepts in providing gravity gradiometers for detecting anomolies in the earth's gravitational pattern has been a relatively large mass which theoretically is needed in order to make use of a sufficient amount of energy to provide the necessary reaction and readout. It has been the view of those versed in the art of measuring gravity that very light masses are not usable.

Among problems present in instruments making use of relatively large masses and mechanical restraint has been the inability to make measurements with such instruments while in transit even though when stationarily mounted in the earth's gravitational field measurements have been highly dependable. Also, wherever mechanical movements and restraint are requisite in the building of such instruments, there is always friction to be overcome and maintenance problems. Those instruments which have been available have been such as to be sensitive to extraneous disturbing conditions which, when extremely delicate measurements are to be taken, often have affected the instruments to a far greater degree than the effect of variations in the gravity field itself.

Obviously, precautionary measures which have had to be undertaken to exclude such disturbances from the measurement have been complicated and costly to such an extent that instruments have in fact been impractical and too costly to build for many purposes.

It is therefore among the objects of the invention to provide a new and improved gravity measurement instrument which depends for its action only on extremely small masses capable of careful non-mechanical control to the extent that the instrument can be readily operated while in transit.

Another object of the invention is to provide a new and improved gravity gradiometer which is substantially free of moving parts, insensitive to temperature variations, totally free of frictional effects, and capable of making rapid continuous measurements while in transit.

Still another object of the invention is to provide a new and improved gravity gradiometer containing instruments which operate in tandem simultaneously at different locations in the earth's gravitational field so that by making simultaneous measurements on each of the instruments a differential effect can be utilized in determining the effect of the earth's gravitational field at any selected location.

Still another object of the invention is to provide a new and improved radio-active isotope field support gravity gradiometer wherein a plurality of instruments are interconnected and operate simultaneously thereby to provide a differential measurement which is free from the effects of shock, vibration, stress and other disturbances, which does not need frequent and careful calibration, which is used as a measurement vehicle thereby to immeasurably improve the accuracy and which by operating on cycles as frequent as $\frac{1}{2}$ second intervals makes possible an instrument which can be readily transported by vehicles such as an airplane to greatly speed up such measurements to a degree heretofore not possible.

Another object still of the invention is to provide a new and improved charged mass field support gravity gradiometer which is capable of accurate measurement even when subjected to shock and tilt encountered in an inclined bore hole such as exists in slant drilling and deep hole drilling for oil wells.

Still another object of the invention is to provide a new and improved charged mass field support gravity measurement instrument which measures travel of the charged mass away from the earth center of gravity as well as travel toward the center of gravity.

With these and other objects in view, the invention consists of the construction, arrangement, and combination of the various parts of the device, whereby the objects contemplated are attained, as hereinafter set forth, pointed out in the appended claims and illustrated in the accompanying drawings.

FIG. 1 is a schematic view showing the basic configuration of an electrostatic sensing instrument utilizing in part externally applied electric fields to support an electrically charged mass in a condition of stable equilibrium.

FIG. 1A is a perspective schematic view of a three axis configuration suitable for energization by alternating current.

FIG. 2 is a schematic view somewhat simpler than FIG. 1 in that it represents a single axis device and which also includes illustrative external circuitry.

FIG. 3 is a schematic representation of a vehicle useful in making gravity measurements over the earth's surface.

FIG. 4 is a longitudinal sectional view of one form of the gravity gradiometer.

FIG. 5 is a longitudinal sectional fore-shortened view of the device of FIG. 4 showing the instrumentation.

FIG. 6 is a cross-sectional view on the line 6—6 of FIG. 5, showing four reset containment electrodes and the electric field liner.

FIG. 7 is a cross-sectional view on the line 7—7 of FIG. 5.

FIG. 8 is a longitudinal sectional view of a special form of the device.

FIG. 9 is a fragmentary longitudinal sectional view on the line 9—9 of FIG. 8.

FIG. 10 is a fragmentary longitudinal sectional view similar to FIG. 9 but showing the device in a different attitude of operation.

FIG. 11 is a schematic view of a vehicle for transporting one form of the device mounted in a manner adapted to simultaneously measure horizontal and vertical gradients of the earth's gravitational field.

FIG. 12 is a side elevational view of one pair of the instruments adapted to the measurement of horizontal and vertical components.

FIG. 13 is a longitudinal sectional view on the line 13—13 of FIG. 12.

FIG. 14 is a schematic sectional view of a modified form of field magnetic support.

FIG. 15 is a schematic sectional view of still another modified form of field diamagnetic support.

FIG. 18 is a fragmentary greatly enlarged view of one of the sensing masses usable in the form of invention of FIG. 16.

FIG. 19 is a longitudinal sectional view of still another form of the invention.

FIG. 20 is a longitudinal sectional view of a form of the invention operable in an extreme tilted attitude.

FIG. 21 is a cross-sectional view slightly enlarged on the lines 21—21 of FIG. 20.

FIG. 24 is a fragmentary schematic perspective view of the containment electrode array of FIG. 23;

FIG. 25 is a schematic view of the mounting of the field supports on a representative frame and with appropriate gravity gradient instrumentation.

Figure 16:
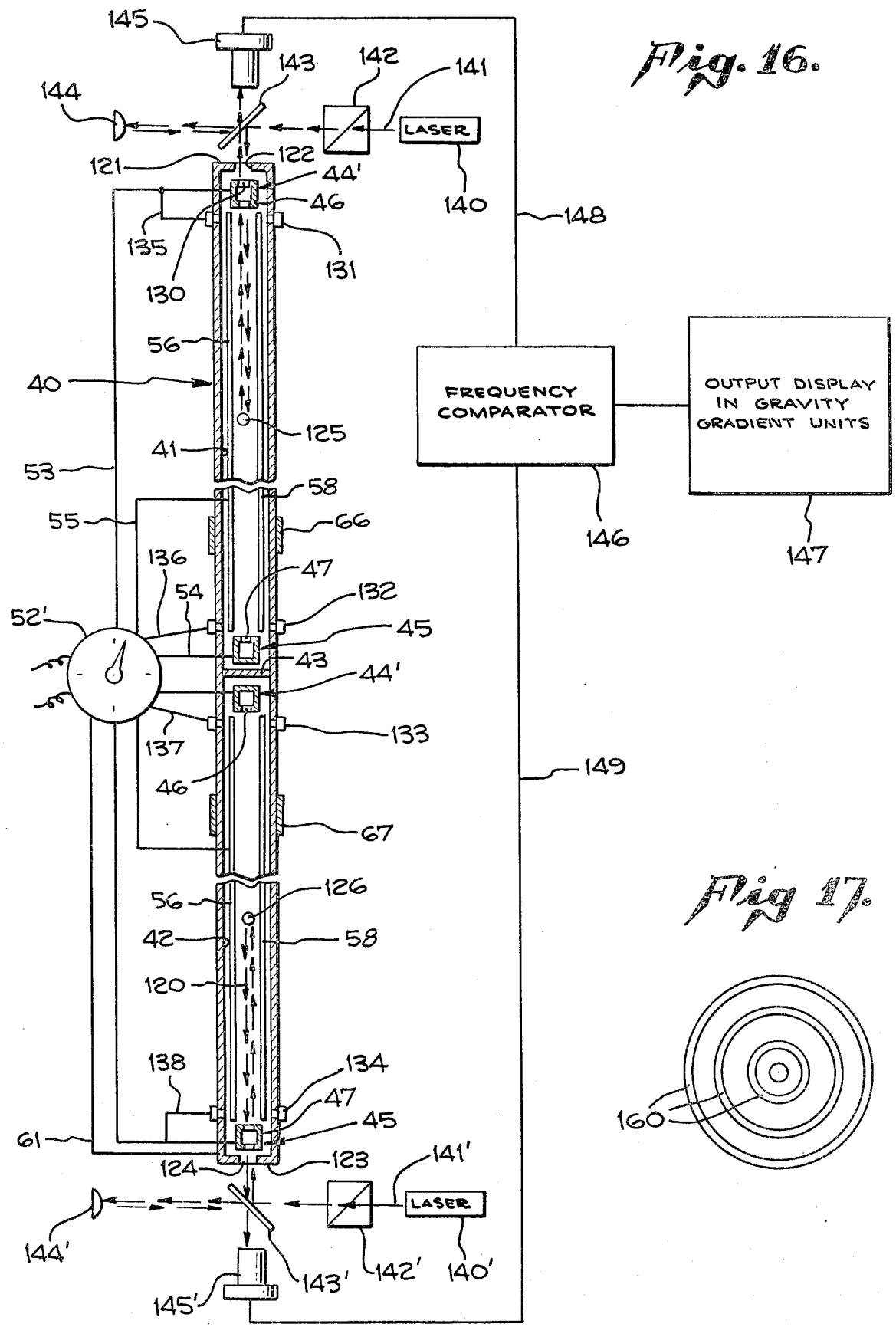
FIG. 16 is a longitudinal sectional view of another form of the invention utilizing laser beams to measure movement of the sensitized mass.

In an embodiment of the invention chosen for the purpose of illustration there is shown in FIG. 1, a central sphere 10 comprising a sensing mass which may be a charged particle. The sphere may be hollow, solid or cellular and is enclosed by an outer stationary sphere or housing 11 of larger diameter. The sphere 10 may be any one of a number of different types of materials as for example dialectric, semi-conducting, or conducting, but is preferably of a material which is stable and does not outgas or change its physical properties. The sphere may be described as a charged particle or sensing mass. Conducting and diametrically opposed sets of energizable plates 12, 12', and 12, 12' surround the sphere 10. Two axes of support are illustrated in right angular relationship and for a three axis support a third pair of plates may be placed on a vertical axis as viewed in FIG. 1. Electric leads 15, 16, 17, 18, and 19, and appropriate switch means (not shown) serve to energize the conducting plates. Detectors 20 may be single, dual or quadrant beta charged particle or radiation detectors, and can be of the solid state types, and are in line with an aperture 21 in conducting plates 12, 12' and slit system 22.

The central sphere 10 in FIG. 1, in one example, contains a radioisotope emitting either positive or negative charged particles and may be, for example, polonium 210 or strontium 89 or 90 in the form of hollow strontium silicate spheres of from 50 to 300 microns in diameter, such as those presently available from the Isotope Products Division of Oak Ridge National Laboratories, Oak Ridge, Tenn. A space 23 within the sphere 11 is maintained at a near vacuum. For each beta that leaves the central sphere or sensing mass 10, there is developed one net unit of positive charge on the sensing mass. If, however, an alpha or positive charge emitter is utilized, the developed charge on the sensing mass is negative. A beta emitter is preferably in most configurations. The result is that an electrical charge is established and maintained on the sensing mass.

The primary purpose of the outer sphere 11 is this particular embodiment and as described in this application is to physically contain the sensing mass, and to maintain the partical vacuum within the space 23. Containment however, may be accomplished in other ways. The material of sphere 11 may consist of various types of materials, but is best composed of material with a dialectic content close to unity in order to reduce the image effect and interference with the applied electrical fields.

The electrical potential developed on the sensing mass is dependent upon a number of factors, such as sensing mass radius, degree of vacuum, maximum energy of the emitted charge particles, etc. It is not necessary to maintain a constant charge and thus a constant charge-to-mass (c/m) ratio for the sensing mass in this embodiment. In the sectional view of FIG. 1 and most configurations, where the sensing mass has three degrees-of-freedom, it may be assumed that there is a third set of conducting plates, at right angles to plates 12, 12' and 13, 13', and in the same approximate proximity to the outer sphere 11, and when three sets of plates are utilized to allow support with three degrees-of-freedom the detector 20 may be of a dual and quadrant type.

The purpose of the energizable conducting plate is to apply external electrical restoring forces along one, two or generally three coordinate axes, to return the sensing mass or charged particle, as the case may be, to its central or null position when the sensing mass is introduced into the containment area 23. When the sensing mass is located anywhere within the area 23 the servo controlled voltages applied to the electrodes 12, 12' and 13, 13' center and hold the sensing mass until the electrodes are energized Apertures 21, FIG. 1, in the plates are arranged so as to be transparent to the betas, nuclear particles or light, depending upon the readout method used, such being emitted from the sensing mass, and allowing them to reach the sensors with little or no attenuation. The apertures are also arranged to produce little or no disturbance in the developed electrical restoring forces. Slit systems 22, are so arranged as to further narrow the width of the beta or positive charge beam emitted from the sensing mass before reaching the detectors.

To best understand the radioactive isotope field support, or RIFS, concept, it is best to consider the simplest possible example, that of single degree-of-freedom or one axis operation, as illustrated functionally in FIG. 2. FIG. 2 is similar to FIG. 1, except that only one set of energizable conducting plate is involved and simplified external circuitry is indicated at 24 and 25. It is assumed that some other limiting or containment method is utilized in FIG. 2 in order that the motion of the sensing mass is restrained along two axes, that of a line to the left and right of the page and that axis represented by an imaginary line perpendicular to the first and into the page. The axis along which the sensing mass is free to move in horizontal or to the left and right relative to the page and is indicated in FIG. 2 by the arrows in the space 22 within outer sphere 11. All of the other factors and conditions are as described for FIG. 1.

When sensing mass 10, FIG. 2 is in the central or null position, shown by the solid line, charged particles or radiation, emitted from the sensing mass or reflected by the mass from an external source, as the case may be, penetrate through the slit system 22, and impinge upon detectors 20 and 20'. The slit systems 22 are so arranged that when the sensing mass 10 is centered and in its null position, the detectors 20 and 20' receive approximately the same number of particles omitted from radioactive source 10 per unit of time, resulting in no signal being transmitted to an amplifier 30. When an inertial input such as gravity or another acceleration displaces the sensing mass 10 in the horizontal direction, i.e. to the left of the paper, as indicated by the inner sphere in broken lines, the detector 20 receives most or all of the particles transmitted through slit system 22, while the detector 20' receives few or no particles. As a result of this displacement of the sphere, detector 20 transmits a signal to amplifier 30. This signal is further amplified in an amplifier 31 and results in the appropriate voltage being applied to plates 12, 12' to return the sensing mass to its null or central position. The amplifier 30 is preferably an A.C. amplifier and demodulator, and the amplifier 31 a D.C. amplifier and voltage source.

The same action occurs if the sensing mass 10 is displaced to the right of the page except that detector 20' receives most of the particles or radiation and transmits a signal to amplifier 30. The voltages, and polarity of same applied to the plates, by the ampifier and voltage source 31 is proportional in direction and magnitude to the inertial input or acceleration along the sensitive axis of the device.

The operation of a two or three axis device, FIG. 1, operates on the same basic principle except that an additional set of energizable conducting plates (not shown in the drawing) is added perpendicular to each sensitive axis, the maximum number of course being three sets in the case of a three-axis or three degree-of-freedom device. In the three-axis configuration, two sets of detectors are required, as shown in FIG. 1, and are generally of the dual and quadrant variety.

If desired, six separate particle or radiation detectors can be used in combination, which will effectively give position signals along all three coordinate axes. In this case a quadrant detector, or four separate detectors in a single unit, such as presently available beta sensitive diodes, senses acceleration along two axes, and a dual detector, or two separate detectors in a single unit, senses acceleration along the third axis. The output from these external detectors is amplified and made to regulate the applied voltage, in amplitude, phase and polarity applied to the three sets of external electrodes.

Various other types of readout may be used as disclosed in patent 3,148,456 such as optical, electrical, magnetic, etc., and the presently described concept is not limited to nuclear particle detection. In fact, with some applications, other methods of readout have proven to be entirely acceptable.

The configuration of FIG. 1 is very basic and is used to illustrate many of the various optical or combined suspension methods.

A further embodiment of the invention chosen for the purpose of illustration in a simpler and more practical form is shown in FIG. 1A. In this form the support is provided by an alternating suspension method where alternating voltages are applied to the electrodes or plates and provide support for the electrically charged sensing mass 10.

For the embodiment of FIG. 1A there is a housing 11' serving substantially the same purpose as the stationary sphere 11 of FIGS. 1 and 2, namely to contain the sensing mass 10 in a vacuum. In this embodiment the housing 11' is made sufficiently large to house also horizontally aligned pairs of energizable plate 12, 12' and 13, 13' on horizontal axes 112 and 113 together with a pair of vertically aligned pairs of energizable plates 14, 14' on a vertical axis 114.

Although separate plates are shown in the interest of easy explanation it should be understood that the walls of the housing 11' can be made of energizable material in which event horizontally aligned walls 12" and 13" provide support along the horizontal axes 112 and 113. Vertically aligned walls 14" provide support on the vertical axis 114.

This embodiment of FIG. 1A utilizes electrodynamic containment of the sensing mass. Unlike the approach of Nordsick U.S. Pat. No. 3,003,356 in the containment method here disclosed the sensing mass is permanently electrically charged by nuclear or other means where the Nordsick device utilizes inductive methods of charging and support. The alternating voltage support is open-looped or passive requiring no readout controlled voltages but requiring an external A. C. voltage for the support of the sensing mass.

In one configuration of FIG. 1A all four horizontally aligned electrodes or plates 12, 12' and 13, 13' are connected together electrically and an alternating voltage is applied between these interconnected plates and the vertically aligned plates 14, 14' which themselves are interconnected electrically. When an alternating voltage is applied to the plates a restoring force is exerted on the electrically charged sensing mass 10 and is a function of the position of the said sensing mass 10 and its displacement from the center of the configuration. The sensing mass 10 is then contained within the approximate center of the cubic array comprising all six electrodes when other external forces are absent. In this embodiment external sensors, 20 and 20' as shown in FIGS. 1 and 2 are not required.

Alternating fields of 300 Hertz have been found to be most satisfactory. Electrode dimensions can be from 0.2 to several centimeters although not limited to these dimensions. For the gravity gradient embodiment the best possible vacuum is required. A radioactive sensing mass with low specific activity of 0.01 millicuries per milligram can be used, with the preferable choice being a beta emitting isotope such as SR 89 or 90. Diameters of the sensing mass can be from less than 100 microns to 350 microns but not limited to these diameters. The alternating field support has been determined to be the most practical to be used in the gradiometer embodiment because of its simplicity and lack of readout requirements this method can also be used to great advantage where two degrees-of-freedom or two axis restoring fields are required such as in the reset phase of the gravity gradiometer. Thus, alternating field suspension can be used to produce passive, non-servoed, three degrees-of-freedom support making it possible to trap and hold a charged sensing mass passively. The said sensing mass can also be released from containment by deenergizing the field or pulsing the appropriate electrode with a voltage pulse that is opposite in polarity to that of the sensing mass and ejecting the sensing mass from the containment array or assembly through a suitable opening or aperture provided in one of the plates.

In the construction of a gravity gradiometer use is made of the form of the device described in connection with FIG. 1A. By way of example there is shown in FIGS. 4, 5, 6, and 7 an instrument for measuring differential gravity effect at a selected location 35 in the earth's gravitational field. The instrument is one of a cyclical or repeating character such that continuous and repeated differential measurements are made as the instrument is moved from one location to another on a suitable vehicle such as an airplane, 37, boat, truck or satellite.

In the embodiment chosen by way of illustration there is provided a sealed tube 40 which houses respective upper and lower chambers 41 and 42 separated by a partition 43. The terms upper and lower refer to the operating position of the instrument with respect to the surface of the earth.

The contents of the upper and lower chambers are duplicates of each other in substantially all respects. Being located at different distances from the earth's center of gravity simultaneous measurements by the upper and lower units are different and the difference is made use of in determining the earth's gravitational gradient at a selected location on the surface.

In the upper chamber 41, by way of example, an upper support assembly 44 is mounted adjacent the upper end of the chamber 41 and a lower support assembly 45 is mounted adjacent the lower end of the same chamber. In practice a chamber about one meter long has been found to be long enough to be useful in making a dependable measurement. The upper support assembly is provided with an aperture 46 facing downwardly and the lower support assembly is provided with an aperture 47 facing upwardly. A single sensing mass 48 serves both the upper and lower support assemblies and at initiation of operation of the device is supported centerably in the upper support assembly 44 by the selected field support system.

Inasmuch as it is the objective of the instrument which embodies upper and lower measuring units to measure the time it takes a free falling body to pass from one point to another a timer is built into the units. The timer is exemplified by an upper photosensitive contact 49 and a lower photosensitive contact 50 electrically connected to a clock 51.

For controlling movement of the sensing mass 48 a cyclical timer 52 is electrically connected by means of leads 53 and 54 to the respective upper and lower support assemblies 44, 45. The timer may be set to operate at any selected time intervals from one as low as ½ second to one a minute or two apart, depending upon the vehicle chosen for the measurement operation.

For guiding the sensing mass during its upward return or reset phase from the lower support assembly to the upper support assembly use is made of rods 56, 57, 58, and 59 arranged in circumferentially spaced relationship in the chamber 41 adjacent the wall of the tube 40. A lead 55 electrically interconnects the cyclical timer 52 to the rod.

A conventional nuclear linear charged particle accelerometer assembly may also be used in place of the restraining rods to supply horizontal restraint and return the sensing masses to the upper assembly during the reset part of the cycle.

In operation the timer 52 operates to energize the upper support assembly 44 and simultaneously pulse and then deenergize the lower support assembly 45. When this circumstance prevails the sensing mass is ejected upward through the aperture provided and returned to and is centerably supported in the upper support assembly by action of energizable support members such as the pairs of energizable conducting plates 12, 12', 13, 13' as described in connection with FIGS. 1 and 2.

When the measurement is to be taken the energized condition is reversed by the cyclical timer 52 namely, by deenergizing the upper support assembly 44 and simultaneously energizing the lower support assembly 45. At the same time the rods 56, 57, 58, 59 are deenergized so that there are no forces acting on the sensing masses during free fall except gravity and whatever extraneous inertial forces may be present. During this active or reading phase of free fall for the masses all electrical elements within the chamber are connected together to completely eliminate image effect and stray electric field forces effecting the electrically charged sensing masses. This is equivalent to a Faraday cage.

As promptly as the sensing mass passes the upper photosensitive contact the clock 51 is triggered and measures the time interval during which the sensing mass 48 passes from the upper photo-sensitive contact 49 to the lower photo-sensitive contact 50 thereby to again trigger the clock 51. After triggering the lower photo-sensitive contact the sensing mass falls through the lower aperture 47 and is then supported in the lower support assembly 45. The time which is measured by the clock for the free fall of the sensing mass in the chamber 41 on which a vacuum is drawn reflects the gravity effect at the selected location.

At the same time a lower clock 51' is making a similar measurement for the fall of the lower sensing mass 48' throughout an equal length of fall but at a location closer to the center of gravity than that of the upper sensing mass 48. Because the upper and lower instruments are interconnected so as to be excited by the same cyclical timer 52 the time measurements are taken simultaneously and the difference in time under such circumstances is made use of in determining the effect of the earth's gravitational field at that particular spot and at that particular moment.

As soon as the sensing masses of both instruments have reached the lower support assembly the instrument is ready for resetting which means that the sensing mass must be returned in each instance to the upper support assembly 48. To accomplish this a pulse lead 61 is connected to the timer 52 and is energized to boost the sensing masses from lower to upper position while at the same time the energization of the respective lower and upper assemblies is reversed namely, deenergizing the lower support assemblies 45 and energizing the upper support assemblies 44. The lower plate 14 in the housing 11' may be connected to the pulse lead 61 for this pulsing operation.

Simultaneously a reset pulse is applied as an A.C. voltage to the rods 56, 57, 58, and 59 so that adjacent rods are of opposite polarity at any given time, whereby a two axis restoring force is set up to guide the sensing mass as it is returned to the upper support assembly in each case.

As a consequence as promptly as the sensing masses 48, 48' enter the upper support assemblies 44 through the aperture 46, each in turn again becomes supported by the respective field and the instruments are immediately ready for a second measurement. Because of the rapid action of the timing the measurements thus described may take place at ½ to 1 second intervals or less so that in practice there are continuous measurements taken as long as the instrument is in operation.

Operation of the device as above described assumes substantially precise vertical alignment of the sealed tube 40 with respect to the earth's surface, resulting from initially aligning the axis of the tube with the spin axis of a vertical gyroscope before the gravity measuring operation is begun. In practice however it is appreciated that the device may experience periodic tilting out of the desired alignment. To compensate for such tilting use is made of the same vertical gyro 65 of substantially conventional design and construction, the gyro being secured to the rod by brackets 66 and 67 as shown in FIGS. 4, 5, and 8.

One or another of several expedients may be employed to actuate the gyro to reset the tube 40 should it be tilted away from vertical, causing the falling path of the sensing mass 48' to be at an angle 70 from the vertical. An optical readout may be preferred, an electrical readout or lasar interferometer. For ease of explanation an electrical readout is exemplified by plates 68, 68' spaced on a horizontal axis. There should also be a second set of plates on a horizontal axis in a direction making a right angle with respect to the first mentioned axis. The plates are shown located adjacent the lower of the two units as suggested in FIGS. 8, 9, and 10.

Should the tube 40 be tilted from vertical an angular distance suggested by the angle indicated as 70 in FIG. 10, the sensing mass 40' when passing the plates 68, 68' pass closer to the plate 68' than the plate 68 and generate a voltage pulse proportional to the displacement and direction. The pulse is made use of by conventional electronic instrumentation to cause the gyro to reset the position of the tube 40 to verticle. In this way very small deviations from vertical alignment are constantly being detected and reset as the progress of measurement continues. In a sense therefor the instrument becomes its own gravity referenced inertial platform. It will further be apparent that the plate arrangement also serves as a means for measuring the angular deviation of the rod 40 from vertical at any given instance. Since it is an important attribute of the sealed tube 40 that it be kept in radial alignment with the earth's gravitation field means other than the gyro 65 and its mounting may be utilized. An example of an acceptable expedient is a substantially conventional inertial platform of a type currently in use, but not illustrated in the drawings. For such an installation the sealed tube 40 is securely anchored to the inertial platform and operation of the inertial platform is then depended on to maintain the sealed tube 40 in its radial alignment.

When horizontal components of the earth's gravitational field are to be measured single units such as that shown in longitudinal section in FIG. 13 are arranged in pairs as shown in FIG. 12. Such paired arrangements are preferably set in two directions as suggested in FIG. 11 namely one in alignment with the direction of movement of a vehicle such as the airplane 37 and another in transverse relationship with respect thereto. Another method whereby this may be effected is by averaging the resultants of the horizontal deflections of the masses, or indicated above, along the horizontal coordinate axis being at right angles to the vertical.

The instrument of FIG. 13 consists of a sealed tube 80 in which a vacuum is drawn providing a chamber 81 for a passageway 82 through which a sensing mass 83 is adapted to travel. Here also there is an upper support assembly 84 and a lower support assembly 85 having mutually facing apertures 86 and 87. Guide rods 88 when energized serve to confine the sensing mass 83 to the passageway 82 during its return or "reset" phase and pulser 89 below the lower support assembly serves to periodically return the sensing mass from the lower support assembly to the upper support assembly. An upper photosensitive contact 90 and a lower photosensitive contact 91 triggered by the passing of the sensing mass activate a clock 92 shown in FIG. 12 to measure the time of free fall of the sensing mass through the passageway 82. In this instance a gyro 93 attached to the tube 80 by brackets 94 and 95 serves to return the tube 80 to vertical position in the same fashion as was described in connection with FIGS. 8, 9, and 10.

There is a duplicate instrument housed within a second tube 80' served by a single timer 96 which also serves the tube 80. Differential measurements are taken simultaneously by the instruments represented by the tubes 80 and 80' and their counterparts in the same fashion as described in connection with the longitudinally aligned units of FIGS. 4 and 5 except that each of the instruments of FIG. 12 employ their own pulsers 89, 89' to return the sensing mass to the upper support assemblies in each case.

As previously noted and as shown in FIG. 11 the pair of instruments illustrated in FIG. 12 are arranged in two orientations, namely, fore and aft and at right angles with respect thereto, if desired. The timers 96 of each pair may be interconnected in order to take simultaneous measurements of all four instruments at any given location. Clearly, the spacing between tubes 80, 80' of the same unit may be as far apart as will be productive of useful differentiation measurements limited only by the size of the vehicle which transports them. Needless to say the instruments measuring horizontal components can readily be timed with an instrument measuring vertical components thereby to integrate all of the measurement operations as the vehicle passes over the area in which the measurements are to be taken.

Although the support assemblies described in the selected embodiment have been referred to as electrical field supports it will be appreciated that other means of support for the sensing mass can be made use of provided they are capable of being energized and deenergized in a cyclical sequence. For example, as illustrated in FIG. 14 opposite support elements on any given axis may be electro magnets 100 and 101 which, when energized, set up a magnetic flux path 102 between them. In this example, a sensing mass 103 is a magnetic material. In the alternative as suggested in FIG. 15 a sensing mass 104 may be a diamagnetic material such for example as graphite, in which there is no polarity. Under such circumstances the magnetic flux path 102 passes around the sensing mass, tending to avoid the mass upon which there is a magnetic repulsive effect and in that way support the mass. The magnetic field of course can be turned on and off by alternately energizing and deenergizing the coils around the magnets.

Although for measuring horizontal components it is convenient to use two pairs of instruments in the alignment indicated. It should be understood that three instruments can be used to accomplish a comparable result where they are arranged in a triangular pattern defining for example, one axis parallel to the path of travel of the vehicle and the other axis transverse with respect thereto.

With the timing cycle at something in the neighborhood of $\frac{1}{2}$ second to 1 second intervals and with passageways or chambers approximately one meter long an instrument of the type described herein, an accuracy can be expected of the magnitude of one EOTVOS unit (EU) which is $10^{-9}$ G per meter. Furthermore since only differential measurements are taken extraneous vibrations and accelerations which affect the instrumentation are cancelled out and do not affect the differential measurements. Masses being approximately the same, the effect of all other accelerations is eliminated as both masses have a similar response to the extraneous accelerations and the only response not shared equally by the two masses is the result of the vertical gravity gradient and is indicated by the difference in the time the two masses take to fall approximately the same distance and separated at all times by approximately the same distance. Extraneous errors can be adjusted out by inverting the instrument to calibrate.

The reading or accuracy of the instrument is independent of the electrical charge on the sensing masses, the mass of the sensing masses or any reasonable variation between the two, slight variations in the release time between the upper and lower masses, the tilt angle of the instrument (within several degrees) as both upper and lower masses must automatically fall the same distance regardless of tilt. It should also be noted that an accurate length standard is not required in the instrument. Such accuracy is a common requirement and problem in most previously proposed falling mass gravity measuring devices and gradiometers. The single quantity which must be measured accurately is time and in the case of this instrument it is the difference in the time of fall which is significant. Time can presently be measured with an accuracy of better than one part in $10^{12}$.

It is understood by those versed in the state of the art that methods of electrically charging the sensing mass may be used other than the presently described RIFS or radio isotope method.

Those methods, are described in copending application Ser. No. 404,294 filed Oct. 9, 1973 and include but are not limited to electron guns, corona discharge, external charged particle radiation, inductive charging, and the production of charging by the phenomena of secondary charging emissions from the charging mass when bombarded by X rays from an external X ray gun or radiation source.

It is also clear that the mass if electrically charged by any of the foregoing methods may easily be de-charged during part of the instrument cycle, if required to reduce the undesireable effects of stray electric fields during the drop or measurement cycle of the instrument.

The most common methods used and that used for example by Hewlett-Packard in their electron spectrometer for chemical analysis or ESCA is to de-charge the mass by supplying a beam of electrons having a uniform low energy to the mass. The potential of the mass can thus be clamped to a potential determined by the energy of those electrons and can be made quite low.

Therefore, if required to reduce error forces due to stray electric fields the sensing masses may be easily charged for handling and caging in the support units and then be de-charged for the drop or measurement part of the cycle.

The charging and de-charging events would naturally occur at the upper and lower terminus of the path length of the upper and lower sensing masses.

In another embodiment of the invention use is made of laser beams for measuring the difference in the acceleration of gravity experienced by the two charged masses. As shown in FIG. 16, the sealed tube 40 has substantially closed upper and lower ends similar to FIG. 5 where the partition 43 midway between upper and lower ends divides the interior of the tube into the upper chamber 41 and a lower chamber 42. In an upper end wall 121 is a transparent closed window 122 and in a lower end wall 123 is a transparent closed window 124.

The lower support assembly 45 in each chamber is the same as that previously described. Upper support assembly 44' differs only to the extent of being provided with a window 130 in the outer wall for the support assembly in the chamber 41.

A sensing mass, usually but not necessarily a sphere 125 operates in the upper chamber 41 and a similar sensing mass or sphere 126 operates in the lower chamber 42. The general character of the sensing mass is shown in the FIG. 18 in one embodiment as comprising a hollow glass sphere about 100 to 300 microns in diameter and spherical to the accuracy of one part in 100. The glass spheres may be coated to give maximum reflectivity or be solid and be so configured as to serve as retro-reflectors. Spheres of the type made reference to are conventional and currently commercially available.

Optical sensors are provided to signal upper and lower ends of the paths of travel of the respective balls 125 and 126. For the upper chamber the upper and lower sensors are identified as 131 and 132. Upper and lower sensors in the lower chamber 42 are identified as 133 and 134. The sensor in each instance is electrically connected to a clock control 52' by lines 135, 136, 137 and 138.

Another set of sensors can be located at the same approximate location as 132 and 134 and in combination with other circuitry, either optical or electrical, be used to sense horizontal displacement of the sensing masses 125 and 126 during their fall if the sealed tube 40 should be tilted from the local vertical.

This readout or signal being due to the instrument tilt can be used to torque and continuously update a simple vertical gyro or other vertical alignment device; as described in the original and previously described embodiments and shown in FIG. 4 at the location of the gyro 65 and FIG. 12 at the location of the gyros 93 and 93'.

The gravity gradient instrument then becomes the equivalent of a gravity based inertial platform and automatically maintains its vertical alignment.

It is also clear that the information thus acquired can be used to sense horizontal gravity gradients in both directions, and magnitude, if the instrument housing is mounted in conjunction with a conventional inertial platform being not gravity referenced.

For servicing the upper chamber 41 there is provided a laser emitter 140 adapted to send a laser beam 141 through an isolator 142 to a beam splitter 143 portions passing through the window 122 and from there through the window 130 into the upper chamber 41. A similar laser emitter 140' or the same laser with a suitable mirror arrangement, and isolator 145 serves the lower chamber 42.

Other portions of the beam pass through the beam splitter 143 or 143' as the case may be and then to the mirrors 144, 144'. Beams are reflected from the mirrors back to the rear of the beam splitters 143, 143' and from there to the respective detectors 145, 145' by paths of lengths different from those determined by the balls 125, 126.

Obviously, where two sensing masses in linearly spaced chambers are being operated simultaneously and their separate circuits carried into the same frequency comparator 146 and output display 147, differences in performance of the respective sensing masses is due to their being located either at different distances from the center of gravity of the earth or at laterally spaced positions are measured and compared and gravitational gradients are thus detected and measured with a high degree of accuracy.

After the beam reflected from the sensing mass 125 is received by the detector 145 its performance is communicated to the frequency or count rate comparator usually including preamplifiers and pulse counters within it, by a line 148.

Similarly, for the lower chamber 42, where comparable parts are similarly numbered but with numbers primed, after the beam from the sensing mass on 126 is received by the detector 145', its performance is communicated to the same frequency comparator 146 by a line 149. The output display or recorder 147 serves the frequency comparator so that the difference in the acceleration of each sensing mass or ball due to the gravity gradient for each cycle of operation, can be compared.

The sensing masses 125 or 126 as the case may be which can be hollow or solid and charged similarly to the sensing mass in the first described form of the invention, is confined in the respective vacuum chamber. The chamber may in fact be as small as one centimeter in diameter.

Figure 17:
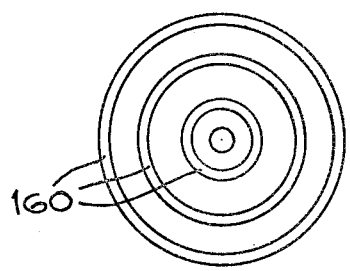
FIG. 17 is a fragmentary view of a laser interference pattern.

When the charged glass ball is stationary an interference fringe pattern 160 such as that illustrated in FIG. 17 may be created.

The system follows to a degree a Michelson Interferometer modified for use in an environment of the type herein disclosed. The glass ball namely a small spherical mirror is taken advantage of because of its very small size and collimation of the laser beam.

As the charged glass ball 125 or 126 moves along the axis when in operation the appearance of each successive pulse means that the electrically charged ball, which is a charged mass, has moved one wave length parallel to the axis of the chamber 41, whether it is moving down or up in the chamber. It is not necessary to know the speed of travel of the ball but only the difference in the acceleration of fall due to the gravity gradient and this is indicated by the output display as the difference in pulse count rate per unit time generated by the two falling masses when vertically aligned in a gravity gradient field.

At the lower end of the path of travel of the ball 125 the sensor 132 will signal the lower assembly 45 through the clock control 52' to energize the lower assembly to catch the ball 125, followed by a pulsing of the lower assembly to return the ball to the upper assembly 44'.

Upon reaching the upper assembly, with that assembly having become energized, the ball will remain caught until released by clock action. The sensor 131 can be made use of to trigger energization of the upper assembly 44'. This action continues in alternate cycles, usually one second or less, according to a pre-set plan of frequency as the instrument is moved.

The action of the ball 125 just described takes place substantially simultaneously for the ball 126 in the lower chamber 42. It is not requisite, however, that the balls be released precisely simultaneously from the upper assemblies 44' and 44 in their respective chambers.

If the two balls are accelerated by the same amount during the drop part of the cycle, the difference in the count rate per unit time produced by the two falling masses is zero, meaning there is no gradient. If there is a time rate of change of the difference in count rate produced by the upper and lower falling masses, then there is a measureable gravity gradient and the magnitude of the said gradient is fed to the display and/or recorder by the frequency or count rate comparator.

Note that any motion of the ball perpendicular to the given axis does not affect this result, by Newton's First Law. Also, note that this result is independent of the charge on the ball. Image forces can be accounted for exactly. The result is also independent of the mass of the ball and of the magnitude of teh velocity of the ball. Stated simply, if the ball is moving freely with constant speed parallel to the laser axis it takes exactly the same time to move a significant distance. In the example discussed it is the wave length of light.

Alternatively, if the ball is accelerating along the laser axis, then the length of time required to move each successive wave length of distance will not be the same and the output of an up-down counter as picked up by the detectors 144 and 144' will not be 0.

Although TTLIC Electronics is capable of being used throughout the system, the computer memory access time is about 1 micro second and since it will take about one thousand computer operations to make each successive computation, about 1,000 fringes will be counted in the example under discussion during each successive computation. That is to say, the logic circuit will let the clock run one way for 512 fringes and then turn it in the opposite direction for the next 512 fringes.

In a more compact arrangement of the invention shown in FIG. 19 a single elongated sealed tube 165 provides a chamber 166. One set of support assemblies includes a lower support assembly 167 at the bottom of the chamber and an upper support assembly 168 at the top of the chamber. A second set of support assemblies includes a lower support assembly 169 at the bottom of the chamber and an upper support assembly 170 at a location intermediate to the top and the bottom.

A sensing mass which may be a retrosphere 171, namely a charged spherical ball, serves the support assemblies 167 and 168. A comparable test mass retrosphere or charged spherical ball 172 serves the support assemblies 169 and 170. It should be borne in mind that the diameter of the chamber 166 is in actual practice very small, sufficient to have the line of communication between the support assemblies on one side and those on the other side very close together so that they can be served by the same laser circuit on the exterior.

The upper support assembly 168 has an aperature 173 in its lower wall. The corresponding lower support assembly 167 has an aperature 174 in its upper wall immediately opposite the aperature 173. In the lower wall is an aperature 175 in alignment with the aperature 174 and with a window 176 in a lower wall 165' of the sealed tube 165.

Simarilarly, there is an aperature 177 in the bottom wall of the upper support assembly 170, an aperature 178 in the upper wall of the lower support assembly 169 in alignment therewith, and a third aperature 179 in the lower wall of support assembly 169. A window 180 in the bottom wall 165 is in alignment with the aperatures 177, 178 and 179.

There is additionally provided a lower optical sensor 181 immediately adjacent to the lower support assemblies, an intermediate optical sensor 182 immediately adjacent to the upper support assembly 170 and an upper optical sensor 183 adjacent to the upper support assembly 168.

The sensors and the support assemblies are electrically interconnected with a clock control 184 by a set of electric lines 184, 185, 186, 187, 188, 189 and 190.

The laser system which serves all of the support assemblies is again a Michelson Interferameter specially modified for use with the two sets of support assemblies.

More particularly there is provided a single laser emitter 190 which projects a laser beam 191 through an isolator 192 into contact with a beam splitter 193. One portion 194 of the laser beam is projected by the beam splitter through the window 180, the aperatures 179 and 178 and into engagement with the charged spherical ball 172.

Another portion 195 of the beam is reflected from a mirror 196 through the window 176 and then through the aperatures 175 and 174 into engagement with the charged spherical ball 171.

A single detector 197 ultimately receives both portions 194 and 195 of the beam and serves a single frequency monitor 198 and output display 199.

In operation, the clock control is set so that normally the upper support assemblies 168 and 170 are energized. When this circumstance prevails the respective charged spherical balls 171 and 172 are suspended within the support assemblies in the same manner as has been heretofore described in connection with the other forms of the invention.

Periodically at the intervals pre-set on the clock control, those upper support assemblies are deenergized and the spherical ball in each instance is released and commences to fall through the chamber 166 under the influence of earth's gravity. Deenergization may take place simultaneously but precise timing for this particular deenergization is not critical. The spherical ball thus released fall under the influence of gravity through the chamber 166 to the lower end and upon encountering the lower optical sensor 181 the lower support assemblies 167 and 169 are energized so that as the spherical balls pass through the respective aperatures 176 and 178 they are caught by the respective support assemblies and momentarily retained suspended in those assemblies. Subsequent thereto by action of the clock control an impulse is conveyed to the respective lower support assemblies 167 and 169 sufficient to project the spherical ball in each instance upwardly through the chamber 166 toward the respective upper support assemblies 168 and 170.

In the case of the spherical ball 171 when it approaches the upper optical sensor 183 the upper support assembly 168 is energized so as to catch and retain the spherical ball 171 as it enters the chamber. In a similar fashion as the spherical ball 172 approaches the intermediate optical sensor 182 the upper support assembly 170 is energized through the clock control and the ball 172 is then caught and suspended in the upper support assembly 170 until the next cycle of operation. This occurs when the clock control moves to the initiation of the cycle for which it has been pre-set whereby to deenergize the two upper support assemblies and repeat the operation just described.

During the fall of the two spherical balls 171 and 172 portions 194 and 195 of the laser beam impinge upon the respective spherical balls 171 and 172 while they are falling, and are reflected downwardly in reverse direction as pictured by arrows in FIG. 19. The reflected portion of the beam 195 passes downwardly through the aperatures 174 and 175 and then out through window 176 to the mirror 196 which reflects it to the rear side of the beam splitter 193 and then downwardly into the dectector 197.

The reflected portion of the beam 194 passes downwardly through the aperatures 178 and 179 then out through the window 180 and then through the beam splitter 193 and into the detector 197.

Since the support assemblies 168 and 170 are at different distances from the earth's center of gravity, the acceleration due to gravity on the fall of the spherical balls 171 and 172 may be the same or different. If it is the same then the initial velocity difference between the spherical ball 171 and 172 will continue unvaried as these two spherical balls fall independently through the distance between the upper support assemblies and the lower support assemblies. Under such circumstance the pulse rate picked up by detector 197 will not vary throughout the drop, and the output display will indicate no gravity gradient.

On the other hand if one of the spherical balls is accelerating at a different rate from the other spherical ball, meaning the the velocity difference between the spherical balls 171 and 172 will progressively change by either becoming greater or becoming less, the pulse frequency picked up by the detector will change during the drop, and be recorded as an appropriate gravity gradient by the readout. In this way gravitational anomalies at any particular point in a grid pattern for example can be immediately compared and measured to an acceptable degree of precision and the measurements plotted with respect to the grid pattern. Clearly as both sets of support assemblies and both charged spherical balls are in precisely the same environment any exterior circumstance which might influence the measurements effect the charged spherical balls to an equal precise degree and character and hence the desired accurancy of the instrument is in no way impaired. Furthermore, having a single laser system serve both sets of support assemblies in the manner described, further enhances the accuracy of the measurements, minimizing to that further extent any possible variations.

It is also apparent that tilt angle sensors located at the same approximate location as sensors 181 can serve a similar function as previously described in the previously described embodiments.

On occasions where the device is to be used in a bore hole as for example for the production of petroleum, the bore hole may be tilted for at least a part of its length at an angle making measurements difficult. Two aspects of a tilted bore hole must be coped with. One is the tilted character of the bore hole being such that when an elongated instrument is lowered into the hole it tends to bang against the sides of the hole causing a disturbance in the action of the device. A second, is the degree of tilt itself which, especially in the case of slant hole drillings, may be so great that the charged mass in free fall will exceed the capability of effective capture at the bottom of the chamber.

In the form of the invention of FIGS. 20 and 21 and additional element is provided, namely, a cylindrical jacket 200 of preferably highly electrically conductive material. In the embodiment shown the cylindrical jacket is mounted within the tube 40 and surrounding the rods 56, 57, 58, and 59 and spaced from the rods. It is usually sufficient to provide a cylindrical jacket in only one of the chambers 42, preferably the lower chamber, but occasion may suggest providing both upper and lower chambers with such a jacket. To activate the jacket there is provided an electric circuit consisting of a lead 201 from the upper end of the jacket through a potentiometer 202 and source of DC power such as a battery through a lead 203 to the lower end of the jacket.

When a steep inclination is encountered, the practice is to energize the rods 56, 57, 58, and 59 during fall of the mass from the upper support assembly 44' to the lower support assembly 45. This energization produces positive charges in opposite pairs of rods and negative charges in the other pairs of rods as indicated by the sign in FIG. 21. Energization of the rods as the mass is falling can be sufficient to guide the path of the mass through the passageway so that it will be caught at the lower end.

Since operation of the device in this fashion is subject to some loss of accuracy such loss can be provided against by calibration. A typical calibrating technique is one wherein the instrument is set to operate vertically with the masses in free fall at a location where the gravity gradient is known, as for example, at the ground surface near the bore hole. Normally, operation of the two chambers located one above the other in such a fashion will result in the lower mass 126 falling faster than the upper mass 125. The practice then is to adjust the DC current flowing end to end of the cylindrical jacket 200 by manipulation of the potentiometer 202 to such an extent that the rate of fall of the mass 126 is the same as the rate of fall of the mass 125.

After this foregoing adjustment when the instrument is dropped in the bore hole with the adjustment in operation measurements resulting are plotted against the calibrated condition of the instrument and the differential then can be depended upon with acceptable accuracy.

Factors which effect the non-calibrated accuracy of the device are as a rule the physical limitations in the construction of the instrument which necessarily are precise to such a degree that inaccuracies even though detected can not be readily corrected.

Although the calibration has been suggested of the lower of the two chambers by for example, slowing down the fall of the charged mass 126, a reverse form of calibration could be performed by, in the alternative, speeding up the fall of the charged mass 125 in the upper of the two chambers.

On those occasions where the device is to be operated during free fall as for example when making the initial measurements prior to calibration, the cylindrical jackets are grounded by closing a switch 204.

During operation subsequent to calibration, inasmuch as both sets of electrodes are energized from the same power supply which should be highly regulated AC high frequency power, namely, with no variation in voltage or frequency, uniformity in guidance of the falling mass is assured.

Since changes in the earth's gravitational effect are experienced by travel of a mass away from the earth's center of gravity as well as in free fall measurement of these aspects by gradiometer instrumentation of the kinds heretofore descibed can be greatly speeded up by additionally measuring the aspects of travel of the mass in a return direction opposite travel in a path in free fall.

Further speeding up of measurements can be accomplished by having the mass in constantly reciprocating motion, up and down, while the measurements are being made.

Figure 22:
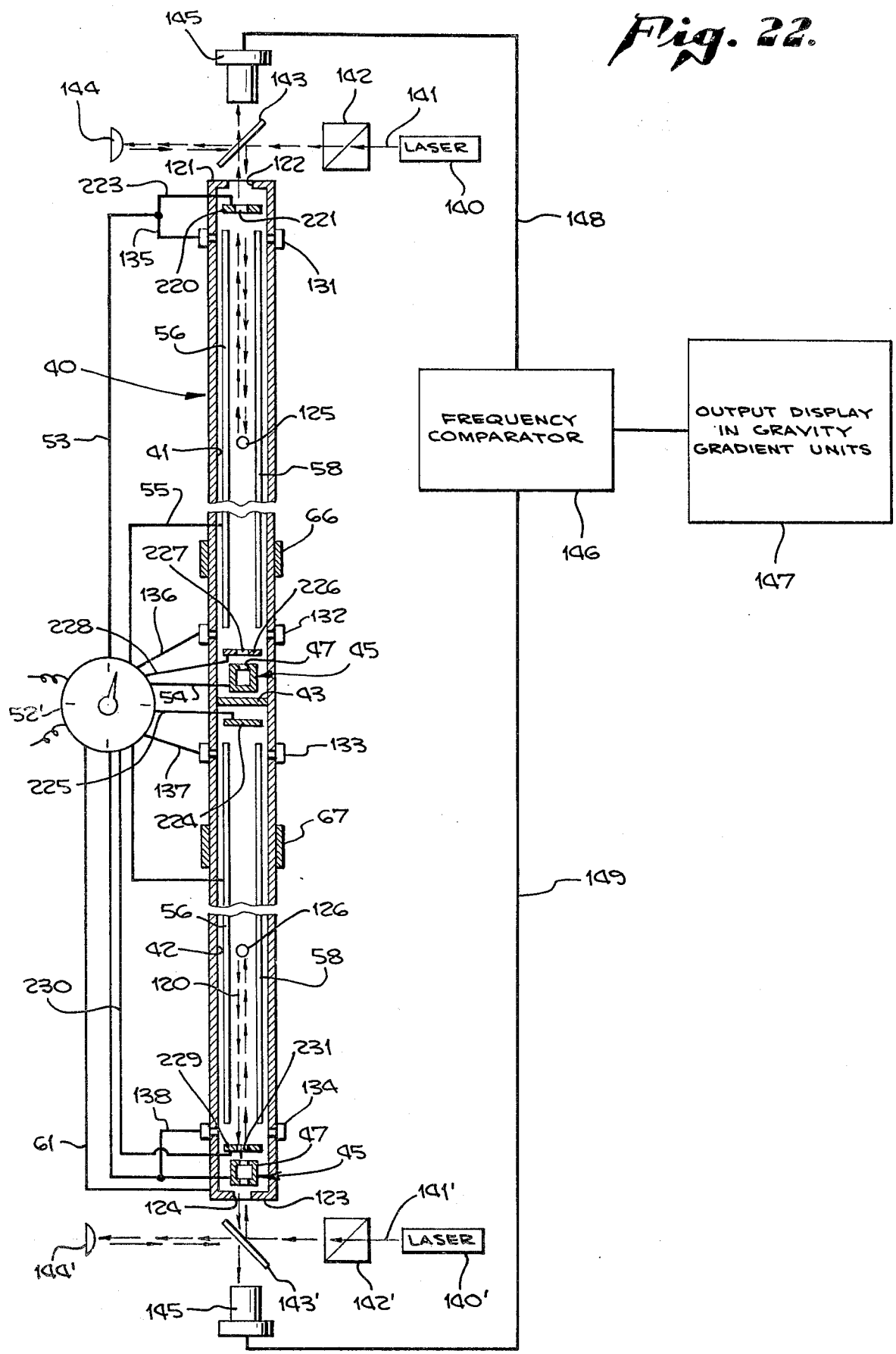
FIG. 22 is a longitudinal foreshortened sectional view similar to FIG. 5 but showing different instrumentation.

For a speeded up version of the instrument there is shown in FIG. 22, for example, substantially the same type of tubular unit as in FIG. 16 except for minor modification in form and instrumentation. Other modifications of the units can be employed in a similar fashion.

As shown in FIG. 22 the upper support assembly 44' in both the upper and lower chambers 41 and 42 respectively have been omitted. The support assembly 44' in the upper chamber 41 has been replaced with an electrode 220 in whch is a central aperture 221 for passage of the laser beam. The electrode 220 is connected to the cyclical trimer 52' by an electric lead 223 feeding into the lead 53.

Similarly an electrode 224 replaces the support assembly 44' in the lower chamber 42, and is connected to the cyclical timer 52' by an electric lead 225.

At the lower end of the upper chamber an electrode 226 provided with an aperture 227 is located adjacent the lower support assembly 45, and connected by an electirc lead 228 to the cyclical timer 52'. At the lower end of the lower chamber 42 is another electrode 229 adjacent the support assembly 45 and is connected to the cyclical timer 52' by an electric lead 230. An aperture 231 is provided in the electrode 229.

In operation of this form of the instrument the charged mass 125 for the upper chamber, and 126 for the lower chamber, in each instance is projected from the respective lower support assembly into the corresponding chamber in the same manner heretofore described for FIG. 16.

The charged mass 125, for example, is then continually axially oscillated up and down in the upper chamber 41 by action of the two electrodes 220 and 226. As the charged mass moves upwardly the decelerating aspect of travel due to gravity is measured by the sensors 131 and 132, after which the aspect of travel during free fall is also measured, when the direction of travel is reversed by an appropriate charge given to the upper electorde 220. Periodic cyclical charges given to the respective upper and lower electrodes 220 and 226 act to keep the charged mass oscillating, or bouncing, up and down in the chamber 41 with time measurements being taken of movement in both directions.

During this time the same activity is taking place in the lower chamber 42 where the charged mass 126 is being oscillated by the electrodes 224 and 229 respectively. In that way the needed differential performance is measured and made use of in substantially the same manner described with respect to FIG. 16.

The net result of instrumentation of the kind disclosed in FIG. 22 is a greatly speeded up taking of measurements, namely more measurements per unit of time, and with the same accuracy and dependability as in the modification of FIG. 16. When the instrumentation is air borne the speeding up can be a material advantage.

It should be understood also that the other versions of the device, as for example, those of FIGS. 5,8 and 12, can be modified in a fashion similar to FIG. 22, in order to take measurements during a decelerating movement of the masses as well as during continuous oscillation of the masses in the respective chambers.

Further still, although the initial focus of attention has been on measurement of the mass during free fall as a means of determining gravitational effect, movement of the mass in the opposite direction, namely upwardly, experiences the decelerating affect of gravity and, should circumstance warrant the instrumentation could be arranged to depend on movement only upwardly instead of downwardly for the various forms of the invention.

Figure 23:
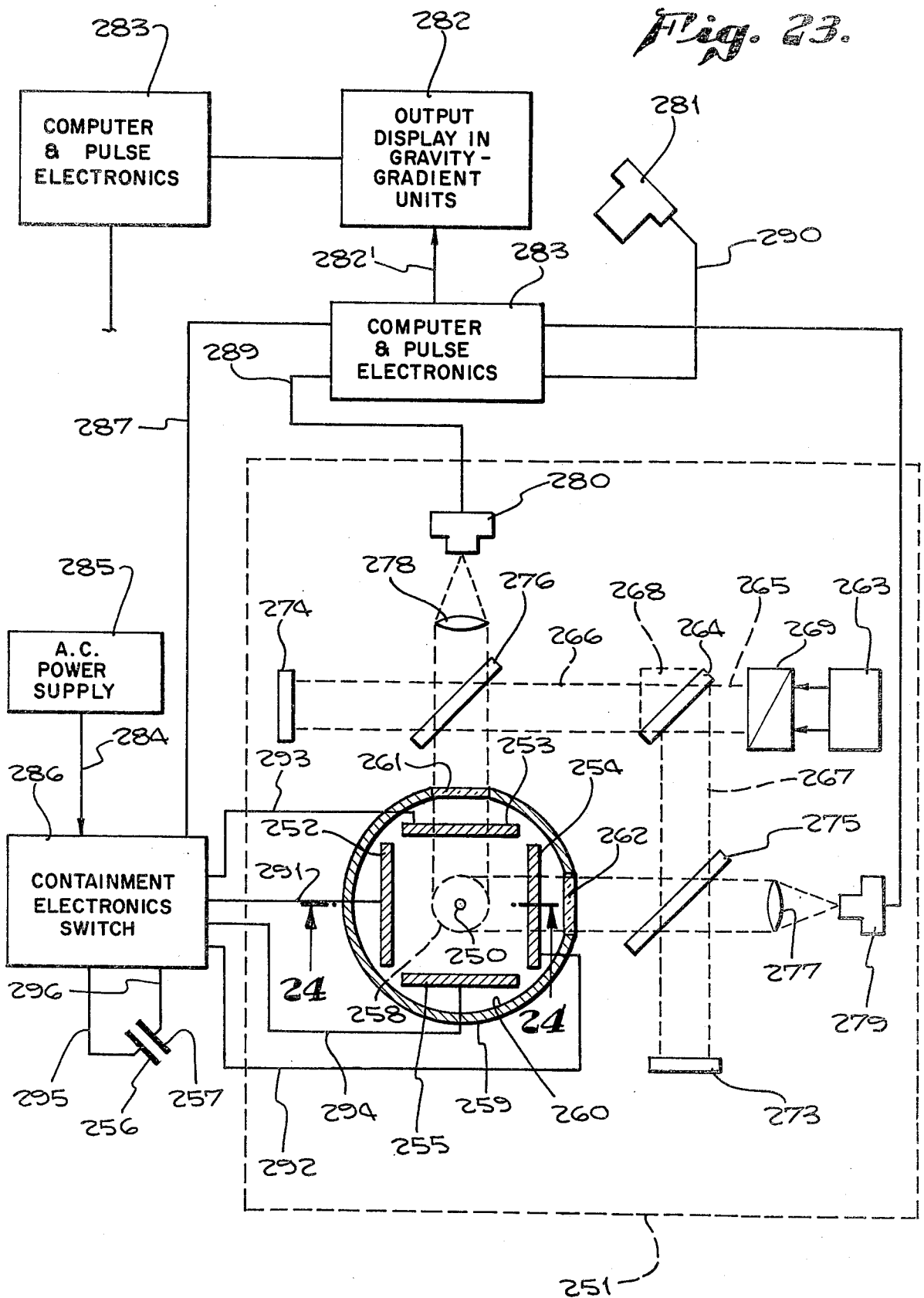
FIG. 23 is a schematic view of a single dynamically restrained inertial reference including a simplified block diagram of the associated electronics and optical readout.

In the modified embodiment of the invention of FIGS. 23, 24 and 25 there is shown a sensing mass or retroreflector 250 in FIG. 23 which may be a hollow or solid spherical retroflector of 60 to 300 microns in diameter. The sensing mass 250 comprises the motivating element of an intermittently restrained inertial reference sensor (IRIR) indicated generally by the reference character 251. Surrounding the mass are six diametrically opposed containment electrodes four of which, namely, 252, 253, 254 and 255, are shown in FIGS. 23 and 24 in a box type configuration. The remaining two electrodes 256 and 257 are in a plane parallel to this page, and may, in the alternative, be a single continuous ring electrode.

Acceptable electrodes are optical quality flats having a conductive material vacuum deposited on the inner surface and allowing non-interference with the readout laser optics. A dotted circle indicates the boundaries of an inner, spherical containment space 258. Surrounding the space 258 is a vacuum envelope or housing 259 allowing a chamber 260 to be evacuated and maintained at the lowest possible gas pressure. Optical quality windows 261 and 262 in the vacuum envelope 259 allow laser beams originating from a laser 263 to illuminate the inner containment space 258 and allow a determination in displacement, direction and magnitude of the sensing mass or retroflector 250, by interferometric methods as suggested in the schematic representation. In the present embodiment, the readout is along all three axes.

The vacuum envelope 259 is arranged so as not to interfere with the three axes optical readout system. The readout system shown consists of three Michelson interferometer systems or the equivalent, functioning with a single laser 263 providing a beam of electromagnetic radiation as the source of illumination. One leg of this system perpendicular to the components of the diagram is omitted in the interest of clarity. A three-way mirror or beam splitter 264 distributes the laser beam 265 along the required three axes 266, 267 and 268. An isolator 269 is used in conjunction with the laser.

Two partially silvered mirrors 275 and 276 are shown, a third being in the view omitted for clarity. Condensing lenses 277 and 278 are associated with the respective mirrors. An optical detector 279 serves the lens 271 and an optical detector 280 serves the lens 278. These can be photodiodes of phototransistors matched in frequency and frequency response of the laser. A reflecting mirror accommodates the mirror 275 and a reflecting mirror 274 accommodates the mirror 276.

A computer and pulse electronic circuitry are contained in components 283. Details of the component 283 are given in copending application Ser. No. 897,677 filed on Feb. 14, 1978. The component 283 receives information regarding displacement of sensing mass 250 from the three detectors 279, 280 and 281 by means of respective electric leads 288, 289 and 290, and passes the information to a containment electronics switch 286 by the lead 287.

For observation and resolution of performance of two or more sensors 251, 251' and the respective motivating elements, there is provided an output display 282 which for information can be in the form of gravity gradient units interconnected by a lead 282' to the component 283. This information is computed from information supplied by the interferometric optical output along all three axes of each device.

An A.C. or D.C. containment pulse power supply 285, usually one of 60 to 3000 Hertz when using A.C. which is connected by a lead 284 to the containment electrodes through the containment electronic switch 286. Connections for those electrodes shown in FIG. 23 are leads 291 and 292 to electrodes 252 and 254 and leads 293 and 294 to electrodes 253 and 255. A connection 287 supplies a pulse to the switch 286 originating in the computer and pulse electronics component 283 so that the motion of sensing mass 250 does not exceed the boundaries of the predetermined spherical containment space 258.

Leads 295 and 296 serve the electrodes 256 and 257 as shown in FIG. 23.

During the reading phase of the instrument, i.e., that interval when the sensing mass 250 is in free and unrestricted motion within the containment area 258, the switch 286 connects all electrodes together in order to provide effective electrostatic shielding for the electrically charged sensing mass. When the computer and pulse electronics component 283 has determined that the sensing mass 250 has reached the outer limits of the containment space 258, a signal is sent to the switch 286 which applies an alternating voltage from the power supply 285 to the containment electrodes 252, 253, 254, 255, 256 and 257. The voltage is applied between all four electrodes including 252, 253, 254 and 255 in one plane, or the single ring electrode, as the case may be, and the plates or electrodes 256 and 287 in the plane 90° removed.

The object of the configuration just described is the dynamic containment of the sensing mass 250 within the containment space 258 so that acceleration, velocity and position changes may be computed by observing the motion of the single sensing mass and the deceleration, or acceleration due to gravity, as the case may be, when in a condition of free fall. In this configuration, such computation will be based upon gravitation conditions with zero error sources due to frictional effects.

The illustrative vector diagram of FIG. 24 shows the sensing mass 250 starting from a point 310 traveling first along a path 311 with a certain force to a point 312 at the outer boundary of the containment space 258. Here it is reversed to travel a path 313 to another point 314 on the boundary. Again it is reversed to travel a third path 315 to a point 316 on the boundary, reversals and new paths continuing as long as the system is in operation.

Action of the sensing mass 250 is indicated in FIG. 24 where the sensing mass 250 is on the first pass across the containment space. Force vectors 318 and 319 indicate the direction, but not necessarily the magnitude, of the force exerted upon the sensing mass 250 when approaching the predetermined boundaries of the containment space 258. This force is applied when the short A.C. containment pulse is delivered to the containment electrodes. The velocity that the sensing mass is given during the relatively short containment phase may be regulated if desired in order to effectively increase the G tolerance of the instrument. When considering the principle of operation it is not important to know the speed or velocity that the sensing mass is given by the A.C. containment or confinement pulse.

Irrespective of the direction of travel of the sensing mass 250 it is always subject to the effect of gravity. In horizontal trajectory there is a falling off from the straight tangent line due to acceleration of gravity. The same is true for travel in an oblique direction upwardly or downwardly, and for travel also in a true downward direction. For travel in a true upward direction deceleration due to gravity is the factor. Such gravitational affects are designed to be sensed by the computer electronics for the two spaced apart sensor units 251 and 251'. The relative results of the two are resolved by a primary computer 320 and revealed by the output display 282 in gravity gradient units.

Also particularly there are three optical systems referred to in FIG. 23, one for each axis. Consequently, the sensing mass 250, at all times being electrically charged, is dynamically confined to the space 258 which is usually spherical and of predetermined diameter. In the example discussed the diameter is 10,000 light wavelengths or about 1 centimeter.

By suitable choice of parameters, the A.C. containment voltage pulse can be adjusted to be of very short duration, that is to be of very short duration compared to the length of time required by the sensing mass to move the 10,000 wavelengths. Thus, thw sensing mass is free coasting most of the time, namely greater than 99 per cent of the time. It is always possible to determine which direction the sensing mass is moving along a given axis by electronically "looking at " the slope of the pulse train.

An alternate method of determining direction of the test mass travel along a given axis is to employ a confinement method wherein confining electrodes carry a D.C. voltage. Whenever the active sensing system determines that the mass is about to leave the containment space 18, the electrode nearest the mass is activated with a pulse of the same sign as the charge on the mass, thus repelling it, and in particular, giving it an increment of momentum along that axis to which the activated electrode is normal. It follows, then, that the component of velocity of the mass along any axis has a sign determined uniquely by which of the two electrodes intercepting that axis has most recently fired. The necessary record of firings of each pair is finally kept by a single flip-flop binary register.

The whole system, that is the evacuated chamber 260 enclosed by the housing 259 is a few cubic centimeters in size and is evacuated, baked and gettered with standard vacuum tube practices. All internal parts are metal or glass. The acceleration and all useful time derivatives of the acceleration of the sensing mass or retroflector relative to the apparatus can be measured electronically using digital I.C. electronics.

The type of gradiometer herein is especially practical for certain applications where inclination is a problem, such as oil well or borehole logging, beyond the limited inclination allowable using a gravity-anomalometer as described in parent application Ser. No. 510,599. Many petroleum and natural gas wells are inclined as much as 15% and it is important to have a gravity gradient recording device capable of in-motion operation that has no limitations as to inclination. In the embodiment of the invention herein disclosed in FIGS. 23, 24 and 25 a containment pulse A.C. or D.C. power supply and containment electronic switch is essentially the same as the switch 286 and containment pulse power supply 285 of FIG. 23 and a computer and pulse electronics component and output display 282 of two vertically spaced components 251 and 251' comprise the gravity-gradient.

FIG. 24 simply shows the possible motion of the sensing mass 250 while making three passes within the containment area. It may be noted in the drawing that the sensing mass is approaching the boundaries of the containment space 258 and of course this will trigger the containment electronics applying a force such as shown for the previous "bounces" and indicated in direction but not magnitude by force vectors 318 and 319 in the figure.

FIG. 25 represents a circuit including two IRIR sensors or components 251 and 251' complete with containment electronics, vacuum envelopes, lasers and three axis interferometric optical systems, separated a known distance by a rigid beam 300 preferably temperature compensated. Some details of the circuit of FIG. 25 may be established to provide the required performance configurations of the IRIR system.

A configuration may be that of utilizing the two IRIR sensors 251 and 251' to sense changes in the acceleration due to gravity and positioned at a known advantageous distance apart as for example by the length of a rigid member 300. The structure and operation of the two IRIR devices 251 and 251' is in no way different from that of the description of FIG. 23 except for the application and external configuration. In this case the highly accurate accelerometer function of the IRIR sensor is utilized to determine changes in the gravity gradient by direct measurement.

Meanwhile the rotational translation sensitivity of the two IRIR sensors may be put to use in maintaining the attitude of the instrument to a local gravity field. Any desired attitude can be maintained, vertical or horizontal.

Electrical connections 302, and 302' supply coded commands to the A.C. switches 285 and 285' allowing A.C. containment pulses from the computer and pulse electronic component to be delivered by leads 303 and 303' to the IRIR units 251 and 251' and pulse signals to be received through leads 304 and 304' as needed.

FIG. 25 may be assumed to comprise a complete highly accurate inertial navigation system, including the two IRIR inertial sensors 251 and 251' separated by the rigid member 300 which, under such circumstances can be in excess of 1 meter in length. In this configuration, accurate in-motion gravity measurements are continuously being made in addition to the inertial parameters of the vehicle, except that the true acceleration of the vehicle relative to inertial space can be differentiated from the acceleration due to gravity. By the last identified arrangement the error source is eliminated which would be produced when the path of the vehicle experiences varying and unknown gravity anomalies.

The combined or averaged output of the two IRIR sensors 251 and 251' effectively reduces the previously discussed "dead" time of a single IRIR sensor to an infintesimal amount, since the dead time of the two separate IRIR sensors rarely occurs simultaneously. Thereby the use of two IRIR sensors as shown in the last described configuration serves a dual function and eliminates the two remaining error sources of a single IRIR navigation or guidance system, that is, variation in known gravity and "dead" time error. Functions of the A.C. power supplies 285 and 285' and containment electronics switches 286, and 286' the computer and pulse electronic units 283 and 283' and a single primarly computer 320 and output display are in general the same as described for FIG. 23. Leads 287, 287' serve the containment electronics switches 286, 286' respectively.

Although only two devices are shown in FIG. 25 in the interest of clarity, it should be understood that for special adaptations three, four or more such sensing devices at fixed positions with respect to each other and acting in concert may be employed.

Figure 26:
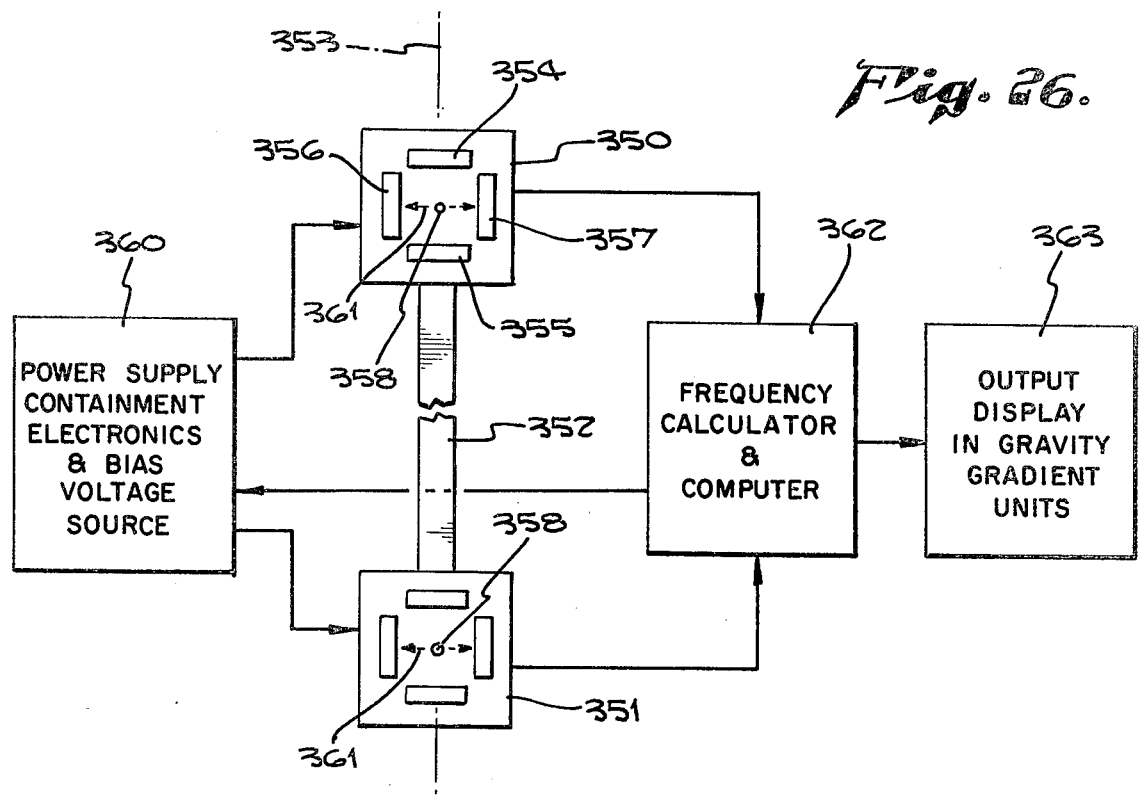
FIG. 26 is a schematic view of a modified static form of the gravity gradiometer which dispenses with the tube.
Figure 27:
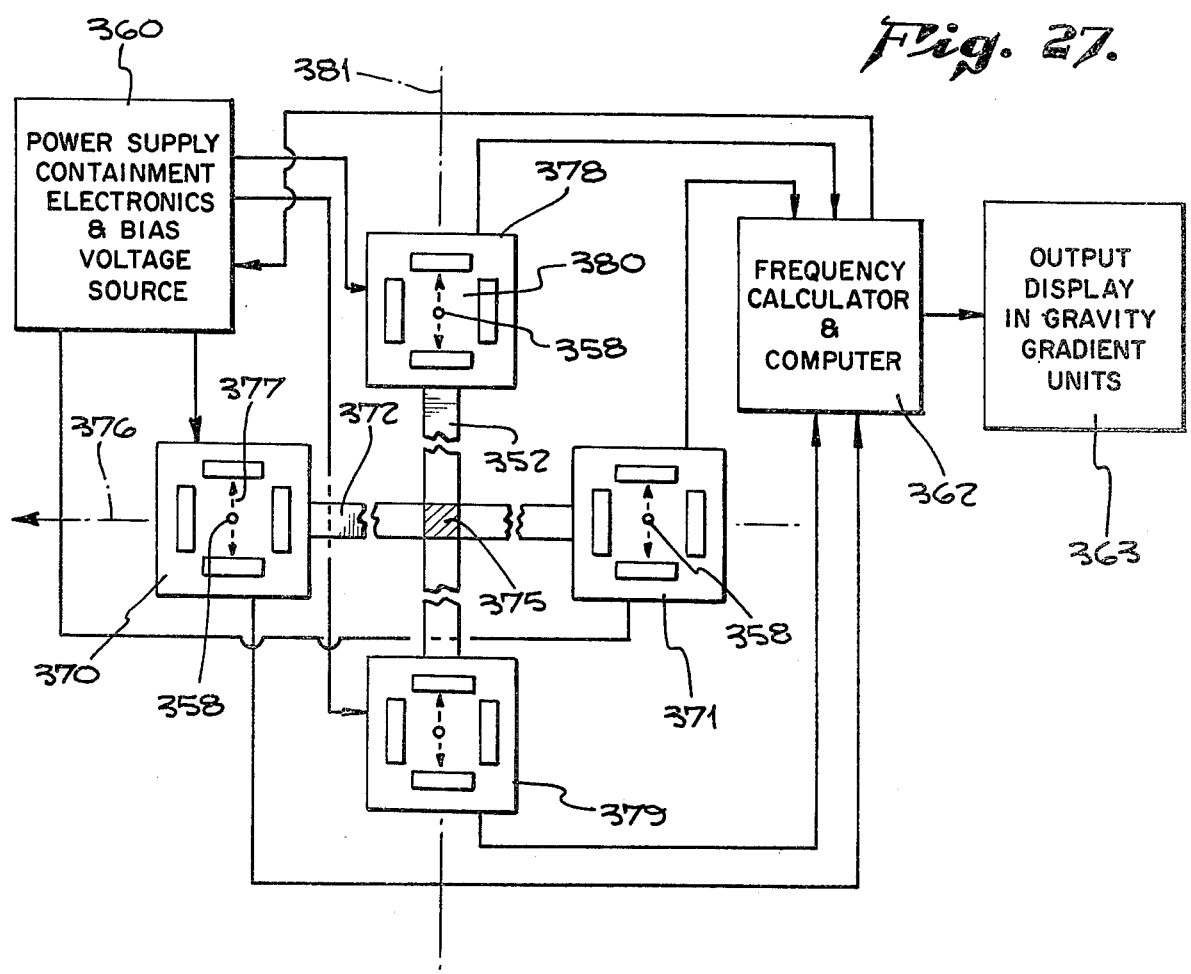
FIG. 27 is a schematic view of the general form of invention of FIG. 26 but further modified to operate during travel.

In the further form of invention of FIGS. 26 and 27, gravity gradient units employ a sensing mass activated on a somewhat modified principle.

For a better understanding of the principle attention is initially directed to FIG. 26 where a simple structure is proposed for measuring the gravity gradient at a fixed location using a stationary instrument. Two gravimeter members 350 and 351 are mounted on a rigid spacer bar 352 at a fixed distance from each other along a vertical measurement axis 353.

Each of the gravimeter members, or gravity gradient units 350, 351, is a cubic array, only two pairs of electrodes of which are shown. These are the vertical pair of electrodes 354 and 355 with one of the pairs horizontal electrodes 356 and 357. A sensing mass 358 is adapted to be centered in the cubic array.

A first operating unit 360 houses a power supply containment electronics capable of supplying an AC voltage to the electrodes of both of the gravimeter members 350 and 351 to center the sensing mass 358 in each instance. A preferably D.C. bias voltage source in the first operating unit 360 supplies a sinousoidal or pulsating D.C. voltage charge to the cubic arrays which is superimposed on the A.C. containment field causing the sensing mass 358 to oscillate in a direction transverse to the vertical axis 353, namely, along the horizontal axis 361.

A second operating unit 362 contains a frequency calculator and computer. The frequency calculator is one adapted to periodically break the circuit from the bias voltage source to the gravimeter members 350 and 351, after which the sensing masses of each continue to oscillate but at a frequency determined by the affect of gravity. Since this frequency differs for similar periodically oscillating masses at different distances from the center of the earth there will be, as between the two sensing masses, a "beat frequency" effect. The output signals from gravimeter member 350 and gravimeter member 351 are entered into the frequency calculator and the resultant beat frequency output placed visually on the output display 363 in gravity gradient units. The entire device can then be shifted to a new location and the operation repeated for a measurement of gravity gradient at the new location. An instrument comparison can also be made of the oscillating frequencies as well as the beat frequencies.

To take gravity gradient measurements with a device in motion, as when being transported by an airborne vehicle over a portion of the earth's surface, use may be made of multiple arrangements of gravimeter members. In FIG. 27, four or more gravimeter members are shown, namely 378 and 379 spaced one above the other and 370 and 371, spaced fore and aft from each other. Two more (not shown) may be employed in the instrument, the other two being located on spacer bar 375 perpendicular to the spacer bars 352 and 272 and in the same horizontal plane as the gravimeter member 370 and 371.

Because the frequency of oscillation is affected by motion in the same direction as the oscillation, for movement of the device along the axis 376 of oscillation of the sensing masses in the gravimeter members is set up in a direction transverse to the direction of travel along an axis 376. In this mode, when the bias voltage is interrupted by the frequency calculator there will be a beat because of the different horizontal locations of the gravimeter members 370 and 371. The beat effect is entered into the corresponding computer and resulting gravity gradient units revealed on the related output display. This will be a horizontal component of gravity gradient.

At the same time and for the same direction of travel along the axis 376 the gravimeter members 378 and 379, with their sensing masses oscillating along the axis 380 continuously measure the vertical component of gravity gradient in a direction perpendicular to the direction of motion. At the same time, when there are gravimeter members on the spacer bar 375, they will measure the transverse horizontal component of gravity gradient.

While particular embodiments of the present invention have been shown and described, it will be obvious to those skilled in the state of the art that changes and modifications may be made without departing from the invention in its broader aspects, and therefore, the aims of its appended claims is to cover all such changes and modifications as fall within the true spirit and scope of his invention.

Having described the invention, what is claimed as new in support of the Letters Patent is as follows:

1. A sensing mass field support gravity measurement instrument comprising an elongated measuring unit adapted to be mounted in substantial radial alignment with respect to the earth's center of gravity,
said unit comprising a tube having an elongated sealed chamber,
upper and lower support assemblies for said mass,
one of said assemblies being mounted in the tube at the upper end of the chamber
and the other of said assemblies being mounted in the tube at the lower end of the chamber,
a single sensing mass adapted to serve both support assemblies, and means including said tube forming a free fall passageway between said assemblies for said sensing mass,
each support assembly comprising a plurality of pairs of energizable support members for said sensing mass aligned on axes perpendicular with respect to each other, and means operably connected to each pair of support assemblies adapted to alternately energize and de-energize said support assemblies in opposite sequence,
apertures in the respective support assemblies on mutually facing sides spaced from each other by said free fall passageway,
a timer having a sequence of operation adapted to cyclically energize and de-energize said support assemblies in opposite sequence,
a sensing mass return pulse means connected to said timer having a cycle of operation in a sequence adapted to periodically return the sensing mass from one support assembly to the other support assembly,
and a clock device for measuring the time consumed in the free fall of the sensing mass from the upper support assembly to the lower support assembly,
said clock device comprising a start trigger for the upper support assembly responsive to the sensing mass upon emergence from the respective aperture and a stop trigger for the lower support assembly responsive to the sensing mass prior to entry into the lower support assembly.

2. A sensing mass field support gravity measurement instrument as in claim 1 wherein the means which forms the free fall passageway includes elongated electrically energizable guide elements mounted at spaced circumferential locations around the passageway and are subject to energization during return of the sensing mass whereby to confine said sensing mass centrally relative to the passageway.

3. A sensing mass field support gravity measurement instrument as in claim 1 wherein the start and stop triggers are pairs of photosensitive elements in an electric circuit with the clock device.

4. A sensing mass field support gravity measurement instrument as in claim 1 wherein there are electrical restoring forces for said electrodes comprising A.C. voltages.

5. A sensing mass field support gravity measurement instrument as in claim 1 wherein there are three pairs of support members on three axes each at a right angle with respect to the other two.

6. A sensing mass field support gravity measurement instrument as in claim 1 wherein support members comprise electromagnets and the sensing mass is a magnetic substance.

7. A sensing mass field gravity measurement instrument as in claim 1 wherein support members are electromagnets and the sensing mass is a diamagnetic substance.

8. A sensing mass field support gravity measurement instrument as in claim 1 wherein the sensing mass is an electrically charged particle.

9. A sensing mass field support gravity measurement instrument as in claim 1 wherein the means which forms the free fall passageway includes a cyclically energizable unit adapted to be energized by operation of said timer during return of said sensing mass from the lower support assembly to the upper support assembly.

10. A sensing field support gravity measurement instrument as in claim 9 wherein there is automatic acting aligning means connected to the tube adapted to maintain said tube in radial alignment with the center of gravity of the earth.

11. A sensing mass field support gravity measurement instrument as in claim 10 wherein there is a detector at the lower support assembly responsive to directional and gravitative eccentric displacement of the sensing mass, and an electric circuit including said aligning means and said detector productive of a restoring operation in said aligning means when said sensing mass triggers the detector at an eccentric location.

12. A sensing mass field support gravity measurement instrument as in claim 11 wherein the aligning means is a single gyro device in operative engagement with both measuring units.

13. A sensing mass field support gravity measurement instrument as in claim 11 wherein the aligning means is an inertial platform on which all said measuring units are mounted.

14. A sensing mass field support gravity measurement instrument as in claim 11 wherein there is a power vehicle comprising a carrier for said measuring units adapted to transport said measuring unit while in operation over the earth's surface.

15. A sensing mass field support gravity measurement instrument as in claim 1 wherein the sensing mass is a radioactively charged particle.

16. A radioactive isotope field support gravity measurement instrument comprising a plurality of measuring units as defined in claim 15 mounted at different locations relative to the earth's gravity field, said means for energizing and deenergizing the support assemblies being electrically interconnected.

17. A radioactive isotope field support gravity measurement instrument as in claim 16 wherein the measuring units are in longitudinal alignment with each other and adapted to be aligned with the earth's center of gravity.

18. A radioactive isotope field support gravity measurement instrument as in claim 16 wherein the measuring units are in spaced parallel relationship with respect to each other.

19. A sensing mass field support gravity measurement instrument as in claim 1 wherein the pairs of support members comprise electrodes.

20. A sensing mass field support gravity measurement instrument as in claim 19 wherein there are electrical restoring forces for said electrodes comprising D.C. Voltage.

21. A gravity measurement instrument comprising a plurality of measuring units as in claim 20 mounted at different locations relative to the earth's gravitational field, said means for energizing and deenergizing the support assemblies being electrically interconnected.

22. A gravity measurement instrument according to claim 20 wherein there is a detector means in operational alignment with said passageway, said detector means being one for the measurement of angles of fall of the mass which are in a direction other than in alignment with the axis of the chamber.

23. A gravity measurement instrument as in claim 20 wherein said mass is a reflector, and wherein there is a laser system including means of projecting laser emissions into said passageway to reflecting engagement with said mass and electronic means in alignment with the path of travel of said mass for measuring the rate of travel of said mass in a direction longitudinally of said passageway.

24. A gravity measurement instrument as in claim 23 wherein said reflectors are hollow translucent spheres of diameter between about 100 to 300 microns.

25. A gravity measurement instrument as in clain 23 wherein said reflector is a solid retroflector.

26. A gravity measurement instrument as in claim 23 wherein said electronic means comprises a system comprising a source of laser emissions, optical means forming one path for said laser emissions into said passageway, optical means forming another path for said laser emissions to the exterior of said passageway, and a readout means for comparing said laser emissions.

27. A gravity measurement instrument as in claim 23 wherein there is a single sealed chamber and two pairs of support assemblies in said chamber, said pairs of support assemblies being at different net distances from the earth's center of gravity, said laser system being in operating alignment with both said pairs of support assemblies and adapted to serve both said pairs of support assemblies.

28. A gravity measurement instrument as in claim 27 wherein the support assemblies of one of said pairs of support assemblies is spaced apart vertically a distance different from the support assemblies of the other pair.

29. A gravity measurement instrument as in claim 27 wherein lower support assemblies of each pair of support assemblies are at the lower end of said chamber and upper support assemblies are at different locations vertically with respect to said lower support assemblies.

30. A sensing mass field support gravity measurement instrument as in claim 1 wherein there are a plurality of measuring units mounted at different locations relative to the earth's gravitational field, said means for energizing and deenergizing said support members being electrically interconnected and wherein the measuring units are in longitudinal alignment with each other and adapted to be aligned with the earth's center of gravity.

31. A gravity measurement instrument as in claim 30 wherein the measuring units are in longitudinal alignment with each other and adapted to align with the earth's center of gravity.

32. A gravity measurement instrument as in claim 30 wherein the measuring units are spaced in parallel relationship with respect to each other.

33. A gravity measurement instrument comprising an elongated measuring unit adapted to be located in radial alignment with respect to the earth's center of gravity, said unit comprising a tube having an elongated sealed chamber, upper and lower support assemblies, one of said assemblies being mounted at the upper end of the chamber and the other of said assemblies being mounted at the lower end of the chamber,
  a movable mass adapted to serve both support assemblies and means including said tube forming a gravity responsive fall passageway between said assemblies,
  each support assembly adapted to hold the mass in place and comprising an energizable support member for the mass and means operably connected to each pair of support members adapted to alternately energize and de-energize said support members in opposite sequence,
  apertures in the respective support assemblies in axial alignment with said passageway,
  a timer for said means having a sequence of operation adapted to cyclically energize and de-energize said support members in opposite sequence,
  a sensing mass return pulse means connected to said timer having a cycle of operation in a sequence adapted to periodically return the mass from one support assembly to the other,
  and a detector means for measuring aspects of the fall of the mass through the passageway.

34. A gravity measurement instrument as in claim 33 wherein said detector means includes measuring instrumentation for measuring aspects of travel of the mass through the passageway in a return direction from the assembly at the lower end of the chamber to the assembly at the upper end of the chamber.

35. A gravity measurement instrument as in claim 34 wherein the return pulse means is a continuously operating means.

36. A gravity measurement instrument as in claim 34 wherein there are a plurality of of operationally interconnected tubes mounted at different locations relative to the earth's gravitational field.

37. A gravity measurement instrument as in claim 34 wherein there are two operationally interconnected tubes in axial alignment.

38. A gravity measurement instrument comprising an elongated measuring unit adapted to be located in substantial radial alignment with respect to the earth's center of gravity, said unit comprising a tube having axially aligned upper and lower elongated sealed chambers, each chamber having an upper and lower support assembly, one of said assemblies being mounted in the upper end of the respective chamber and the other of said assemblies being mounted in the lower end of the chamber, a movable mass adapted to serve both support assemblies and means including said tube forming a gravity responsive fall passageway between said assemblies, each support assembly being adapted to hold the mass in place and comprising an energizable support member for the mass and means operably connected to each pair of support assemblies adapted to alternately energize and de-energize said support assemblies in opposite sequence, apertures in the respective support assemblies in axial alignment with said passageway, a timer for said last mentioned means having a sequence of operation adapted to cyclically energize and de-energize said support members in opposite sequence, a sensing mass return pulse means connected to said timer having a cycle of operation in a sequence adapted to periodically return the mass from one support assembly to the other, a detector means for measuring aspects of the fall of the mass through the passageway, electrically energizable elongated guide elements mounted at spaced circumferential locations around the fall passageway and extending along the sides of said fall passageway, said guide elements being subject to energization during fall of said mass through said fall passageway, a cylindrical jacket of electrically conductive material in one of said chambers, and an electric circuit interconnecting opposite ends of said tube having electrically energizable control means for selectively setting the voltage and frequency of electric energy flowing therethrough.

39. A gravity measurement instrument as in claim 38 wherein the cylindrical jacket is located between the guide elements and the tube.

40. A gravity measurement instrument as in claim 39 wherein the guide elements comprise pairs of elongated rods with adjacent rods energized in opposite polarity.

41. A gravity measurement instrument as in claim 38 wherein there is a cylindrical jacket in each of said chambers.

42. A gravity measurement instrument comprising an elongated measuring unit adapted to be located in radial alignment with respect to the earth's center of gravity, said unit comprising a tube having an elongated sealed chamber, upper and lower electrode members, one of said electrode members being mounted in the upper end of the chamber and other of said electrode members being mounted in the lower end of the chamber.
  a chargeable movable mass adapted to serve both electrode members and means including said tube forming a gravity responsive fall passageway between said electrode members,
  each electrode member comprising energizable means operably connected to each electrode member to alternately energize and de-energize said electrode members in opposite sequence,
  an aperture in at least one on the electrode members in axial alignment with said passageway,
  a timer for said energizable means having a sequence of operation adapted to cyclically energize and de-energize said electrode members in opposite sequence,
  a sensing mass return pulse means connected to said timer having a cycle of operation in a sequence adapted to continuously pass the mass from one electrode member to the other in an oscillatory sequence, and a detector means for measuring aspects of travel of the mass in both directions through the passageway.

43. A gravity measurement instrument as in claim 42 wherein there is a plurality of operationally interconnected tubes mounted at different locations relative to the earth's gravitational field.

44. A sensing mass instrument for field support gravity measurement comprising a frame having an axis thereof adapted to be mounted in a position of alignment substantially in a radial direction with the earth's center of gravity and to transverse the surface of the earth to selected locations,
- a plurality of gravimeter members mounted at fixed spaced locations on said frame in alignment with said axis, a sensing mass in each gravimeter member, and means within each gravimeter member forming a sealed chamber for said sensing mass, a cubic electrode array for each sealed chamber, and
- containment means operably connected to each gravimeter member and the electrode array therein to simultaneously energize said gravimeter member,
- portions of the respective chambers defining opposite ends of traverse paths of movement of said sensing mass,
- detector means adjacent the gravimeter members operatively associated with the electrode array of each gravimeter member adapted to sense the position of the respective sensing mass, motivating means and gravity measurement means in operative association with said detector means,
- said motivating means being operatively associated with each electrode array and adapted to cyclically shift the position of the sensing mass therein each time the sensing mass reaches the end of a traverse path,
- said gravity measurement means being responsive to the free fall movement of each sensing mass during each traverse path and gravity gradient computerization and display means responsive to respective gravimeter members whereby to signal the gravity gradient at each selected location of the earth's surface.

45. A sensing mass instrument as in claim 44 wherein the traverse path is a tube and portions of the cubic array are at opposite ends of the tube.

46. A sensing mass instrument as in claim 44 wherein the traverse path is in the sealed chamber, the sealed chamber is spherical and the cubic array is in the spherical chamber.

47. A sensing mass instrument as in claim 44 wherein there is a separate detector for each pair of three pairs of electrodes in each electrode array.

48. A sensing mass instrument as in claim 47 wherein the detector means is laser motivated.

49. A sensing mass instrument for field support gravity measurement comprising a frame having a measurement axis thereof adapted to be mounted in a position of alignment substantially in a selected direction with respect to the earth's center of gravity and to traverse the surface of the earth to selected locations,
- a plurality of gravimeter members mounted at fixed spaced locations on said frame along said measurement axis, each said gravimeter member having a sealed chamber, a sensing mass for each gravimeter member in the sealed chamber, a cubic electrode array for each sealed chamber, and
- containment means operably connected to each gravimeter member and the electrode array therein to simultaneously energize said gravimeter member, said containment means comprising an A.C. source for activating said sensing mass to a position centrally of the electrode array, said containment means including a biasing voltage source connected to said electrode array for oscillating said sensing mass along an axis transverse to the measurement axis,
- a frequency calculator and computer means electrically responsive to the oscillating frequency of said masses, circuit control means interconnecting said bias voltage source and said frequency computer whereby to enable measurement of differences in residual frequencies of oscillation of said masses when said bias voltage is interrupted, and an output display responsive to said computer for display of relative oscillating frequencies of said masses measured in gravity gradient units.

50. A sensing mass instrument as in claim 49 wherein the bias voltage is a D.C. voltage.

51. A sensing mass instrument as in claim 49 wherein there are a plurality of measurement axes for said frame in respective transverse relationship and two gravimeter members mounted on the frame on each measurement axis at spaced distances from each other.

* * * * *